(12) United States Patent
Goradia et al.

(10) Patent No.: US 12,443,856 B2
(45) Date of Patent: Oct. 14, 2025

(54) DECISION INTELLIGENCE SYSTEM AND METHOD

(71) Applicant: Kobai, Inc., Pleasanton, CA (US)

(72) Inventors: Parag Goradia, San Ramon, CA (US); Ryan Andrew Oattes, Burlington (CA); Lakshmi Prasad Reddy Nanga, Pleasanton, CA (US); Luis Antonio Monterrubio Ruiz, Burlington (CA)

(73) Assignee: Kobai, Inc., Pleasanton, CA (US)

( * ) Notice: Subject to any disclaimer, the term of this patent is extended or adjusted under 35 U.S.C. 154(b) by 90 days.

(21) Appl. No.: 16/731,965

(22) Filed: Dec. 31, 2019

(65) Prior Publication Data

US 2020/0210857 A1    Jul. 2, 2020

Related U.S. Application Data

(60) Provisional application No. 62/787,127, filed on Dec. 31, 2018.

(51) Int. Cl.
*G06N 5/02*    (2023.01)
*G06F 16/25*    (2019.01)
*G06N 20/00*    (2019.01)

(52) U.S. Cl.
CPC ............. *G06N 5/02* (2013.01); *G06F 16/252* (2019.01); *G06N 20/00* (2019.01)

(58) Field of Classification Search
None
See application file for complete search history.

(56) References Cited

U.S. PATENT DOCUMENTS

| | | | |
|---|---|---|---|
| 6,694,321 B1* | 2/2004 | Berno | G06F 16/252 |
| 6,772,395 B1* | 8/2004 | Hyman | G06F 40/143 |
| | | | 715/234 |
| 8,214,319 B2 | 7/2012 | Gould et al. | |
| 8,370,362 B2* | 2/2013 | Szabo | G06Q 30/0269 |
| | | | 707/739 |
| 9,069,748 B2* | 6/2015 | Folting | G06F 16/2465 |
| 9,092,824 B2* | 7/2015 | Akkiraju | G06Q 10/06393 |
| 9,330,084 B1* | 5/2016 | Kadambi | G06F 16/3329 |
| 9,507,820 B1* | 11/2016 | Hannah | G06F 16/211 |
| 10,585,983 B1* | 3/2020 | Paley | G06N 5/02 |
| 10,809,881 B2* | 10/2020 | Kindelsberger | G06F 3/04847 |
| 10,817,533 B2* | 10/2020 | Kim | G06F 16/2455 |

(Continued)

FOREIGN PATENT DOCUMENTS

EP    1081609 A2    3/2001

OTHER PUBLICATIONS

Mansingh, Gunjan, Kweku-Muata Osei-Bryson, and Han Reichgelt. "Building ontology-based knowledge maps to assist knowledge process outsourcing decisions." Knowledge Management Research & Practice 7.1 (2009): 37-51. (Year: 2009).*

(Continued)

*Primary Examiner* — Maria S Ayad
(74) *Attorney, Agent, or Firm* — Haley Guiliano LLP

(57) ABSTRACT

A decision intelligence system permits a data expert to input information to define business questions and a business knowledge model. A semantic ontology is generated from the business knowledge model. The business knowledge model is mapped to data sources and used to generate information for generating APIs for generating views of business data, such as machine generated data.

14 Claims, 23 Drawing Sheets

Controlled API, ensuring access only for users with sufficient tags in their profile.

(56) References Cited

U.S. PATENT DOCUMENTS

| | | |
|---|---|---|
| 11,240,313 B2* | 2/2022 | Rakshit .................. H04L 67/10 |
| 11,886,804 B2* | 1/2024 | Radzewsky ......... G06F 16/9017 |
| 2004/0083199 A1 | 4/2004 | Govindugari et al. |
| 2004/0113953 A1* | 6/2004 | Newman ............... G06F 3/0483 |
| | | 707/E17.012 |
| 2005/0149558 A1* | 7/2005 | Zhuk ....................... G06F 8/10 |
| 2005/0228784 A1* | 10/2005 | McCauley .............. G06F 16/43 |
| 2005/0251512 A1* | 11/2005 | McCauley .............. G06F 16/43 |
| 2006/0106824 A1 | 5/2006 | Stuhec |
| 2007/0028234 A1 | 2/2007 | Sero et al. |
| 2007/0106520 A1 | 5/2007 | Akkiraju et al. |
| 2008/0177622 A1 | 7/2008 | Akkiraju et al. |
| 2009/0112801 A1* | 4/2009 | Bloesch .................. G06F 16/14 |
| 2009/0222760 A1* | 9/2009 | Halverson ............ G06F 40/177 |
| | | 715/781 |
| 2010/0191699 A1 | 7/2010 | Gould et al. |
| 2011/0125734 A1* | 5/2011 | Duboue .................. G09B 7/00 |
| | | 707/723 |
| 2012/0221484 A1 | 8/2012 | Damschroder et al. |
| 2012/0246111 A1 | 9/2012 | Raja |
| 2013/0054601 A1 | 2/2013 | Whitlock et al. |
| 2013/0124957 A1* | 5/2013 | Oppenheimer ......... G06F 40/18 |
| | | 715/212 |
| 2013/0196305 A1* | 8/2013 | Adir ..................... G06Q 50/205 |
| | | 434/322 |
| 2013/0326470 A1* | 12/2013 | Jentsch .................... G06F 8/35 |
| | | 717/104 |
| 2014/0122535 A1* | 5/2014 | Gerard .................... G06F 16/00 |
| | | 707/802 |
| 2014/0207861 A1* | 7/2014 | Brandwine ............. H04L 51/52 |
| | | 709/204 |
| 2014/0358890 A1* | 12/2014 | Chen .................. G06F 16/3329 |
| | | 707/710 |
| 2015/0039577 A1* | 2/2015 | Talagala .................. G06F 3/064 |
| | | 707/703 |
| 2016/0098651 A1* | 4/2016 | Tai ....................... G06Q 10/067 |
| | | 705/348 |
| 2016/0140208 A1* | 5/2016 | Dang .................. G06F 16/2228 |
| | | 707/737 |
| 2017/0109355 A1* | 4/2017 | Li ............................ G06N 5/022 |
| 2017/0192962 A1* | 7/2017 | Gou ...................... G06F 40/205 |
| 2017/0212482 A1* | 7/2017 | Boettcher ................ F24F 11/30 |
| 2017/0213469 A1* | 7/2017 | Elchik ...................... G09B 7/02 |
| 2017/0235848 A1* | 8/2017 | Van Dusen ........... G06F 16/904 |
| | | 705/12 |
| 2018/0165316 A1* | 6/2018 | Chen ..................... G06F 16/23 |
| 2018/0349461 A1* | 12/2018 | Bhoovaraghavan .. G06F 16/275 |
| 2019/0043379 A1* | 2/2019 | Yuan ................... G06N 3/0445 |
| 2019/0228099 A1* | 7/2019 | Bajaj .................. G06F 16/3329 |
| 2019/0318272 A1* | 10/2019 | Sassin ................... G06F 16/254 |
| 2020/0012656 A1* | 1/2020 | Pugh ..................... G06F 16/248 |
| 2020/0133559 A1* | 4/2020 | Auvenshine ........... G06F 3/0605 |
| 2020/0186605 A1* | 6/2020 | Rakshit ................... G06F 3/017 |
| 2021/0294781 A1* | 9/2021 | Fernández Musoles ..................... |
| | | G06F 16/367 |
| 2021/0303635 A1* | 9/2021 | Mostafa .............. G06F 16/9024 |
| 2023/0185647 A1* | 6/2023 | Oattes ............... G06F 16/24534 |
| | | 714/57 |

OTHER PUBLICATIONS

Heymans, Stijn, et al. "Ontology reasoning with large data repositories." Ontology Management. Springer, Boston, MA, 2008. 89-128. (Year: 2008).*

International Preliminary Report on Patentability for PCT/US2019/069119, mailed Jul. 15, 2021, 8 pgs.

International Search Report and Written Opinion for PCT/US2019/069119, mailed Mar. 16, 2020, 30 pgs.

Supplementary European Search Report of EP 19 90 7252 dated Aug. 23, 2022.

* cited by examiner

Controlled API, ensuring access only for users with sufficient tags in their profile.

DECISION INTELLIGENCE SYSTEM AND METHOD

CROSS-REFERENCE TO RELATED APPLICATIONS

This application claims priority to U.S. Provisional Application Ser. No. 62/787,127, titled "Asset Relationship Management System and Method", filed Dec. 31, 2019, which is hereby incorporated herein in its entirety by this reference.

TECHNICAL FIELD

The present disclosure is related to decision intelligence technology.

BACKGROUND

Many business intelligence systems utilize a "Data Lake," which may include one or more storage repositories that hold a vast amount of raw data in its native format until it is needed. Referring to FIG. 1, one common approach for building a business intelligence system is to build a knowledge model/ontology from the schema and/or data underlying the source systems associated with the Data Lake. In this conventional approach, the knowledge model/ontology is automatically created from underlying data.

In the conventional approach, end users then attempt to make decisions using visualizations and other analytical tools built upon the automatically created model/ontology. However, in practice many decision intelligence systems have not worked as well as desired for enterprise and Industrial Internet of Things (IIoT) ecosystems.

In modern industrial enterprises, there is often a vast amount of machine data generated by IIoT ecosystems. But conventional decision intelligence systems do not provide a satisfactory solution for decision makers. Even machine learning approaches are often unsatisfactory, because the machine learning algorithms are operating in a vacuum without the context of asset supply chain, engineering, commercialization, service, etc.

SUMMARY

A decision intelligence system permits a data expert to input information to define business questions and a business knowledge model. A semantic ontology is generated from the business knowledge model. In some implementations, the business knowledge model is mapped to data sources and used to generate information for generating APIs for generating views of business data, such as machine generated data.

An exemplary method includes capturing a business knowledge model from an expert user to have a semantic ontology. The business knowledge model being associated with a business question and including concepts and properties. The data is mapped for the business knowledge model. An application programming interface (API) to deploy the translated business knowledge model and associated business question, concepts, and properties.

An example software service, includes a studio application configured to build a business knowledge model having a semantic ontology, for at least one business question, based on inputs from a data expert, and identify a mapping strategy to map data to the business knowledge model. A platform application in communication with the studio application has an interface to access data sources selected for the business knowledge model, the platform application performing question execution and data mapping for the business knowledge model.

DETAILED DESCRIPTION

Decision Intelligence System Overview

Figure 2:
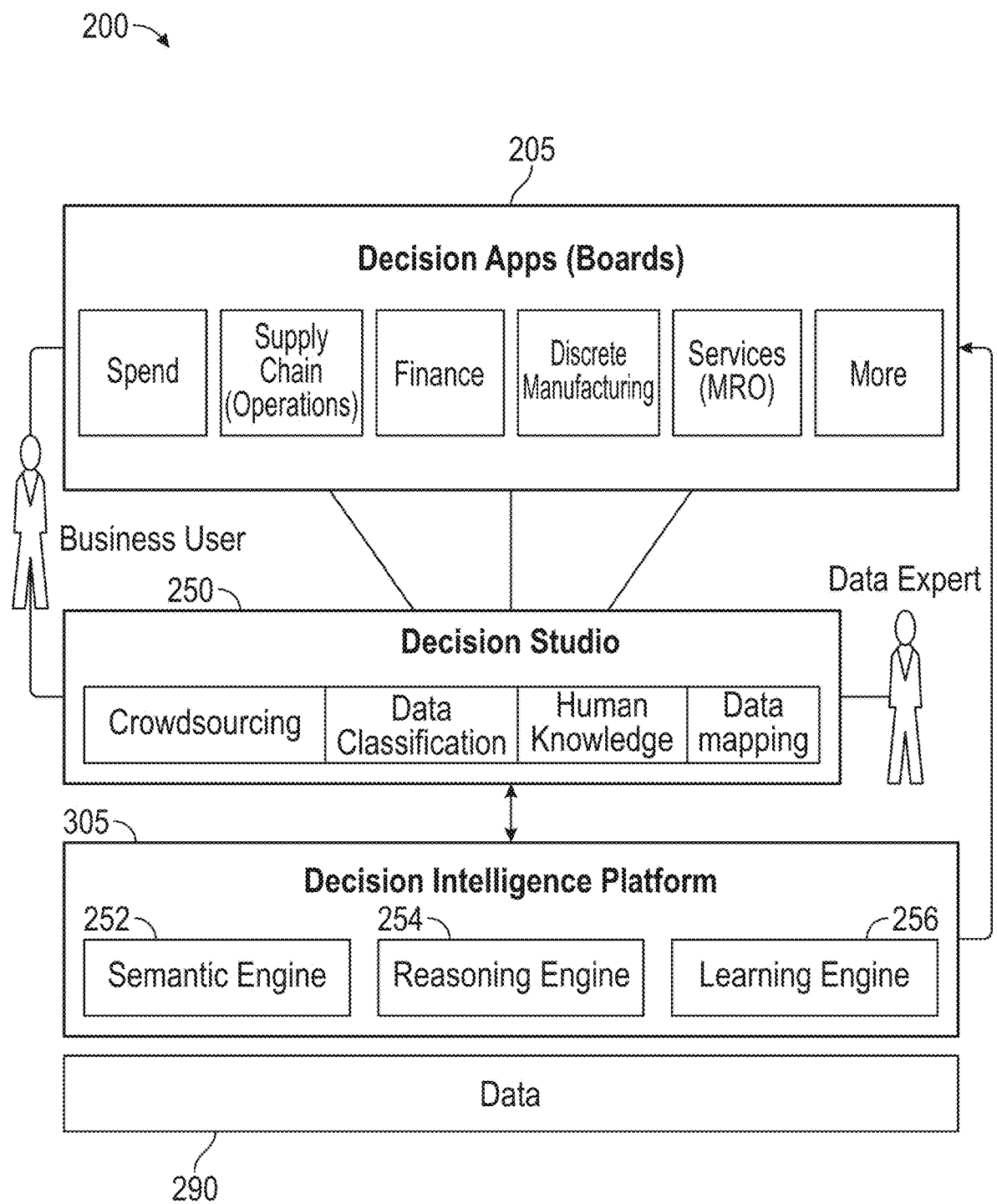
FIG. 2 illustrates a decision intelligence system in accordance with some implementations.

FIG. 2 is a high-level diagram of a Decision Intelligence system 200 in accordance with some implementations. One or more Decision Applications 205 may be provided for answering business questions associated with data sources 290 such as enterprise and Industrial Internet of Things (IIoT) ecosystems. The Decision Intelligence applications 205 provide both analytical and transactional capabilities for the user of the applications. In some implementations, the decision intelligence applications include domain-specific templates that include question and answer models. Intuitive decision boards may be provided to visualize decision intelligence in real time and on-demand. As illustrative (but non-limiting) examples, the Decision Applications 205 may be for spending, supply chain operations, finance, discrete manufacturing, services, etc.

A Decision Intelligence Studio 250 supports domain experts (which may be non-programmers) creating business knowledge models for use by business users. A Decision Edge 270 is provided to aid in orchestration. The Decision applications 205 can be customized for a variety of different decision-making roles. The underlying data sources 290 may, for example, include enterprise and IIoT data sources.

A Decision Intelligence Studio 250 supports generating a business knowledge model based on inputs from a data expert. The data expert may be an individual who applies business expertise to generate the business knowledge model. The data expert is a domain expert (e.g., a business analyst, a product manager, or a business user). The Decision Intelligence Studio 250 may, for example be implemented in computer program code.

In some implementations, a data expert can configure business knowledge models using a user interface to enter questions and solutions and generate mapping data. This permits a non-programmer to configure the business knowledge models used to generate information for the Decision Application 205. The business knowledge models are based on a semantic concept of ontology, and questions are built upon semantic queries.

The ontology defines the elements of business involved in a business ecosystem and organizes a relationship of them to each other in turn. That is, an ontology is a set of concepts and properties in a subject area or domain. Semantics is the study of meaning. A semantic ontology is an ontology expressed using language in which there is an agreed understanding of what the terms mean. Having a semantic ontology built upon business knowledge models defined by a domain expert familiar with how language is used by a business provides many benefits in comparison to the conventional approach of automatically generating an ontology based on the characteristics of the data in the underlying data system.

One aspect is that this approach provides a variety of benefits, particularly in applications in which there is a large amount of machine-generated data, such as in IIOT. The semantic ontology provides numerous benefits. However, to utilize the semantic ontology, other aspects of a decision intelligence solution require modification to facilitate aspects such as mapping between the semantic ontology and the underlying source data, which may include a variety of different data types and data structures.

In some implementations, the Decision Intelligence Platform 305 includes a semantic engine 252 to support generating a semantic ontology, a reasoning engine 254 to support logical functions, and a learning engine 256 to continually improve performance. A Data Expert (which may be a non-programmer, such as a domain expert, product manager, or business analyst) aids in generating the semantic ontology.

In some implementations, the Decision Intelligence system 200 builds an ontology based on the inputs of the Data Expert. Specifically, in some implementations, after capturing a knowledge model from an expert user, the Decision Intelligence System 200 allows all interactions with that knowledge model, including mapping data to it and formulating questions against it, to be conducted in the semantics and terminology familiar to the expert user.

Figure 1:
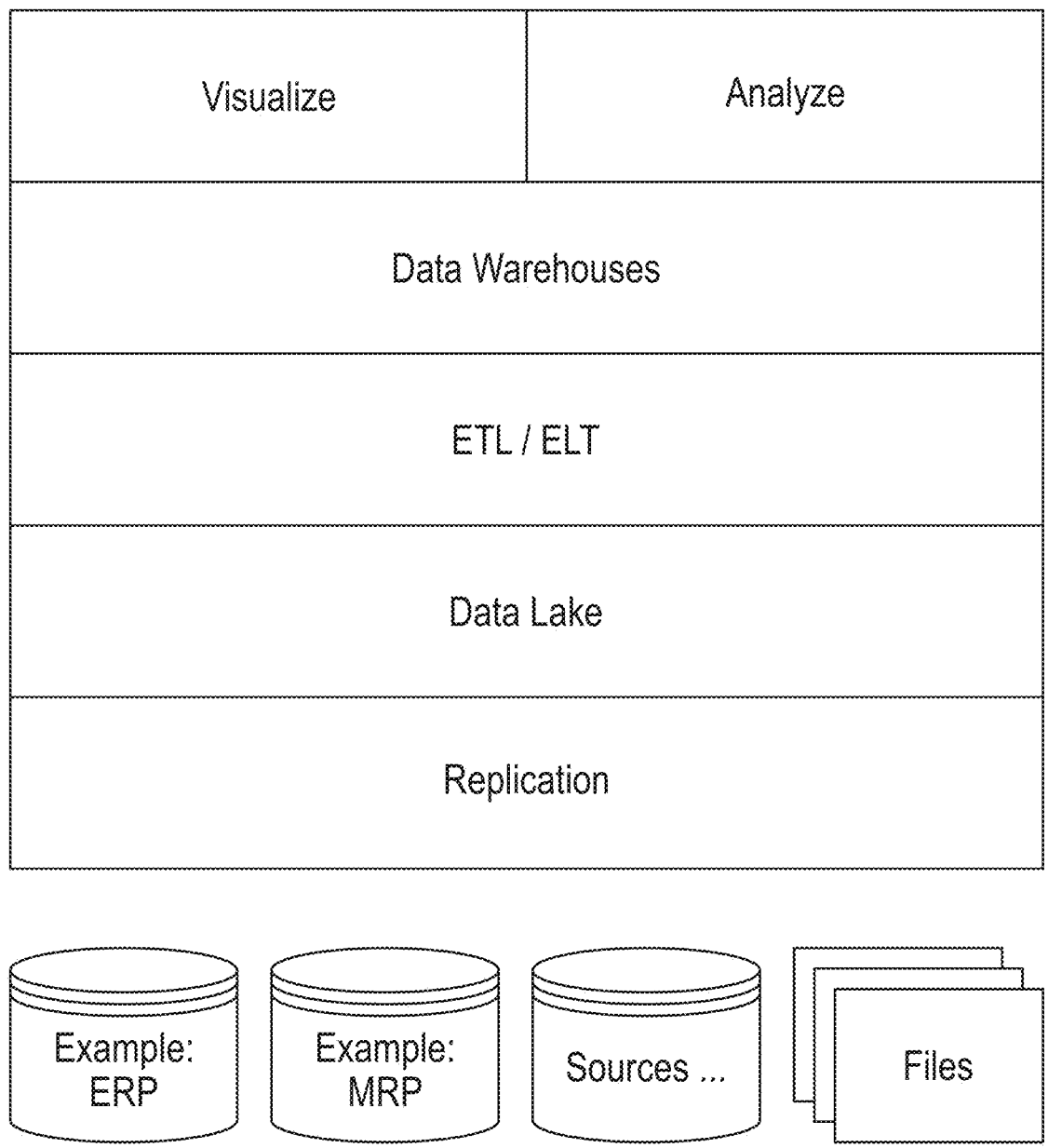
FIG. 1 illustrates an example of a decision intelligence system based upon a data lake.

Some applications of the Decision Intelligence system of FIG. 1 include solving complex decision-making needs. An illustrative example includes decision intelligence for an IIoT ecosystem.

Figure 3:
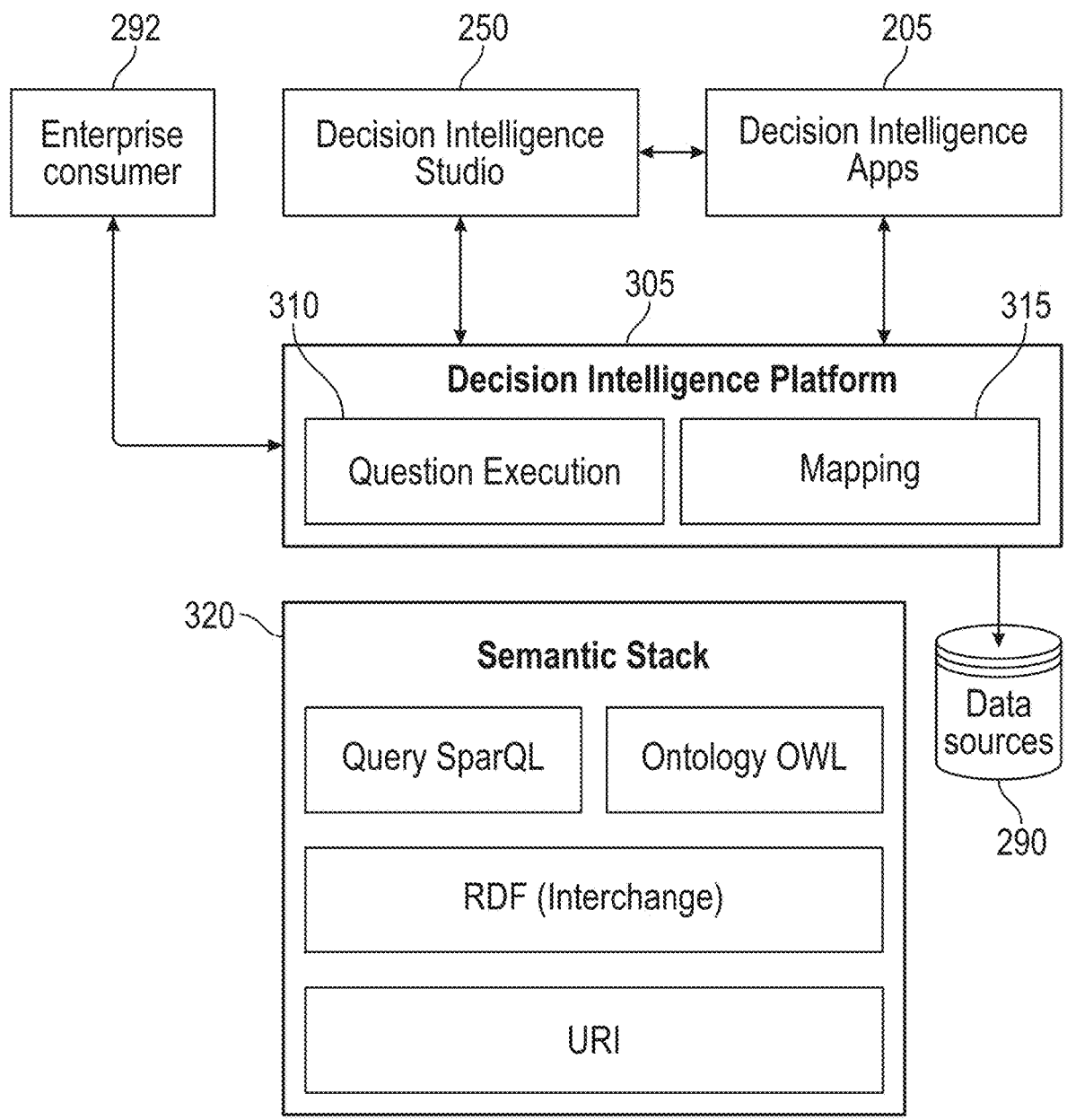
FIG. 3 illustrates a decision intelligence system in accordance with some implementations.

FIG. 3 shows how the Decision Intelligence Studio 250 and decision intelligence applications 205 are supported by a Decision Intelligence Platform 305. An exemplary set of interface interactions is illustrated by the arrows. The Decision Intelligence Platform 305 may, for example, include hardware, software, memory, and firmware to support the generation of user interfaces to support a mapping engine 315 and question execution engine 310.

In some implementations, the Decision Intelligence Platform 305 leverages portions of a Semantic Web software stack 320. This facilitates interfacing with enterprise data sources as well as a variety of consumption/visualization technologies. The semantic Web Software stack 320 may, for example, include a Uniform Resource Identifier (URI), a Resource Description Framework (RDF) exchange, a Query SparQL semantic query language, and Ontology OWL (web ontology language). The Decision Intelligence System 100 leverages off the Semantic Web software stack and extends them to function in complex enterprise environments. In some implementations, the query execution can be supported by an Ontology-based Data Access (OBDA), and extends them to function in complex enterprise environments. In some implementations, the extensions support interfaces with enterprise data sources 290 as well as for consumption by other components 292 of the system and by visualization tools.

In some implementations, the Decision Intelligence Studio 250 is an interactive hub for business users and data experts. In some use scenarios, it can be used to crowdsource business knowledge, securely stitch cross-domain data, and enable continuous learning. An exemplary set of features of the Decision Intelligence Studio 250 implemented by the semantic engine 252, reasoning engine 254, and learning engine 256 includes:

Knowledge model creation and editing capabilities with collaborative templates to capture knowledge in a manner from which a semantic ontology may be created Question authoring and editing capabilities, allowing business users to specify queries against the knowledge model, visually, with no code writing.

User interfaces to support data mapping to incrementally & securely stitch data from multiple data sources APIs for publishing intelligence to visualization tools in real-time and on-demand In some implementations, the Decision Intelligence Applications 205 are dynamic applications for business users to create digital threads for closed-loop execution by connecting human knowledge and contextual data across multiple domains. As a few examples, they may include domain-specific templates that include question and answer models specific to an expert domain. They may include intuitive decision boards to visualize intelligence in real-time and on-demand.

In some implementations, the Decision Intelligence Platform 305 is implemented as a series of engines, including a question execution engine 310 and a mapping engine 315 for ingesting, querying and analyzing the data organized by a knowledge model. Additional sub-engines may be included to support other features. An exemplary set of engine features for the Decision Intelligence Platform 305 includes:

- Ingestion to multi-model data stores used for various data types.
- Semantic query execution
- Metadata and data storage
- Roll based access control security mechanisms
- Automation of API deployment The Decision Intelligence Platform 305 is also responsible for accessing data sources. In one embodiment, the Decision Intelligence Platform 305 combines data from all the operational systems located at a site or edge. In some embodiments, it brings together all the data generated by the enterprise systems in a private or public cloud of the enterprise (e.g., ERP, CRM, PLM, MES, MRO, etc.).

Interfaces are provided for end-users (e.g., enterprise consumers) 192 to access the Decision Intelligence applications 205. In some implementations, the Decision Intelligence system 200 provides both mobile and web interfaces for end users to access and use the Decision Intelligence applications 205.

The Decision Intelligence Studio 250 may be used by an expert user to define a business knowledge model. In some implementations, the Decision Intelligence Studio 250 interacts with the Decision Intelligence Platform 305 to create metadata around a user's business knowledge model that acts as an abstraction on top of a data platform. This metadata abstraction enables the separation of business logic from the data structures which eliminates many data platform complexities. It allows the business user to self-service their needs and answer their business questions quickly.

In some implementations, human intelligence is collected directly from domain experts, which allows the formulation of questions in the terminology and semantics of the domain experts, and requires only the minimum amount of data mapping required to satisfy the questions being asked. As an example, domain models can be configured based on questions & solutions, resulting in the generation of mapping data corresponding to a data expert. Also, as described below in more details, various features may be included to support reusability and reduce the need to perform additional data mappings as decision intelligence solutions are refined over time. A combination of features may be employed to reduce the cost of changing the model over time, reduce the time of implementing changes, and provide benefits of reusability, and extensibility.

Figure 4A:
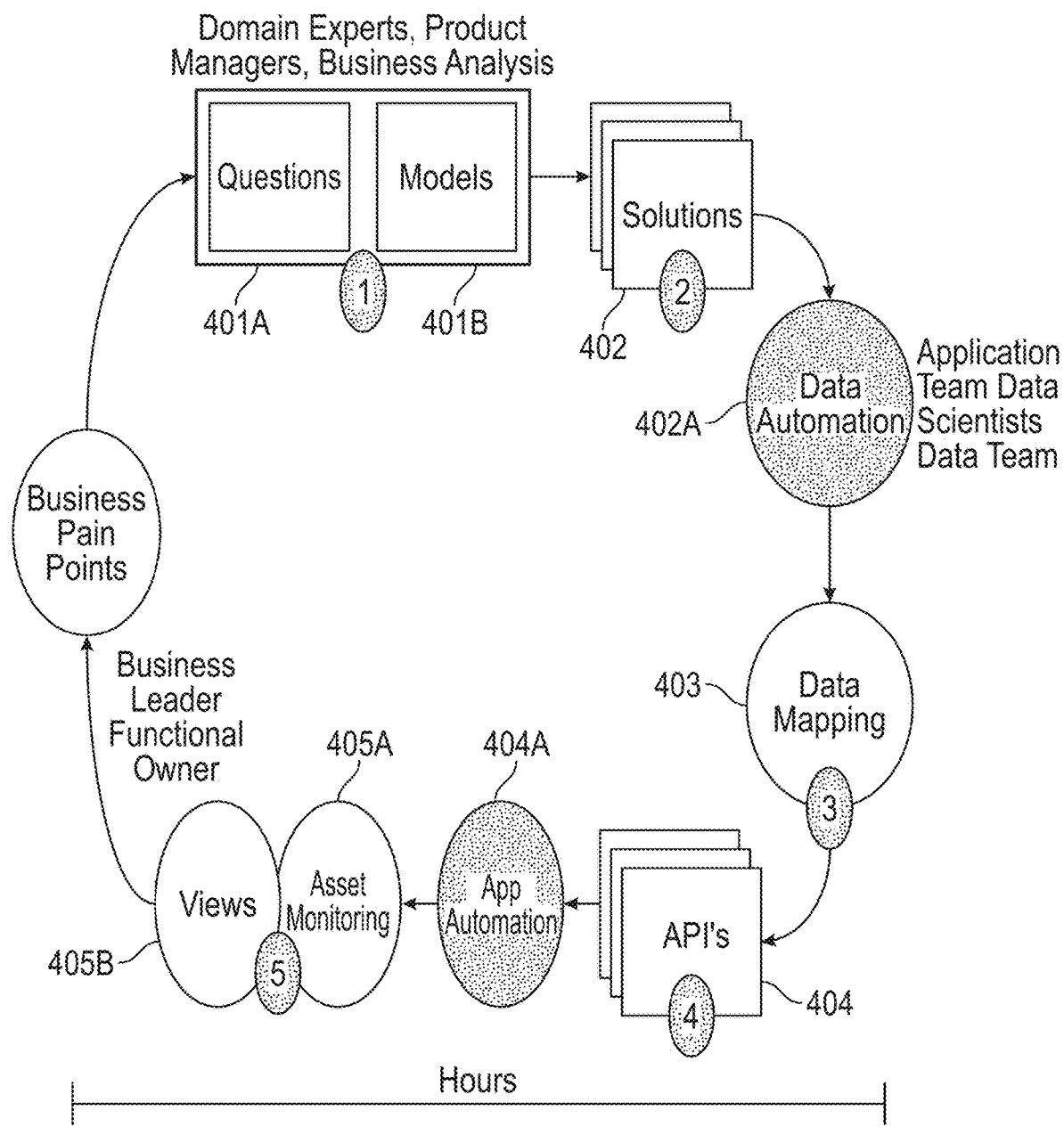
FIG. 4A illustrates an exemplary sequence of actions to develop a decision intelligence solution in accordance with some implementations.

FIG. 4A is a diagram illustrating an example of sequence of steps allowing Decision Intelligence solutions to be developed. Some of the major steps involved in the solution include:

In step 401A, a business question is identified and formulated. As an example, a business question could be what is my service margin this month?

In Step 401B, the user then uses the Decision Intelligence Studio 250 to create a business model or domain model around the business question. The model comprises concepts and properties.

Steps 401A and 401B can be continued iteratively around a set of business questions until all the business questions are captured and their respective models created. This results in a set of knowledge models that includes concepts and properties.

In step 402, the questions and models are bundled into a solution. This can be thought as an instantiation of the model and question.

In step 402A, data automation takes care of translating the questions and models into semantic ontologies and generates the necessary code and logic to be executed. In some implementations, additional support, if required, is provided by an application team, data scientists, and a data team to support the data automation.

In step 403, a data map is generated to link the solution questions and model to the data elements. The concepts and properties from the model are mapped to their respective data elements from various data sources.

In some implementations, to link the conceptual model to the underlying data, a process of mapping is utilized which allows atomic elements of data sources (e.g., rows/column, xml tags, etc.) to be graphically associated with atomic pieces of the model (properties, attributes, etc.). In some implementations, this is done in a guided and highly reusable way that requires no code writing by the user or any of the traditional BI/ETL operations of joining or staging data in static data models. In one implementation, the asset is also viewed as a piece of its whole ecosystem in which it operates, in contrast with viewing the asset performance alone. As discussed below in more detail, the guidance and reusability aids in efficiently creating and deploying decision intelligence solutions.

In step 404, an API step involves validating and publishing the question as an API call which returns the resulting data for that question.

In some implementations, step 404A is an application automation step that involves bundling the APIs and deploying them to a containerized production environment. In some implementations, the container-based services are auto scalable and self-healing.

In step 405B, the API results are automatically configured and displayed in the Views, so that the business users can view their results. The View may be based around a monitored asset 405A. That is, in some implements the Views are automated views centered around an asset, although more generally the Views may be centered around an asset, fleet, enterprise or ecosystem based around business knowledge model that a user defines in the Decision Intelligence Studio 250. In one implementation, the Decision Intelligence Platform 305 creates, manages and stitches together data and analytics around an asset. The asset could be anything that a user may want an analytic on but typically is something that is important to the enterprise for e.g.: a building, a hospital, a restaurant, a truck, human workforce, engine, turbine, etc.

It will be understood that this sequence of steps may also be represented by flow charts of different degrees of detail.

One aspect of the sequence of actions in FIG. 4A is that User Interfaces (UIs) may be provided. In some implementations, this allows decision intelligence solutions to be developed in time periods as short as a few hours.

Figure 4B:
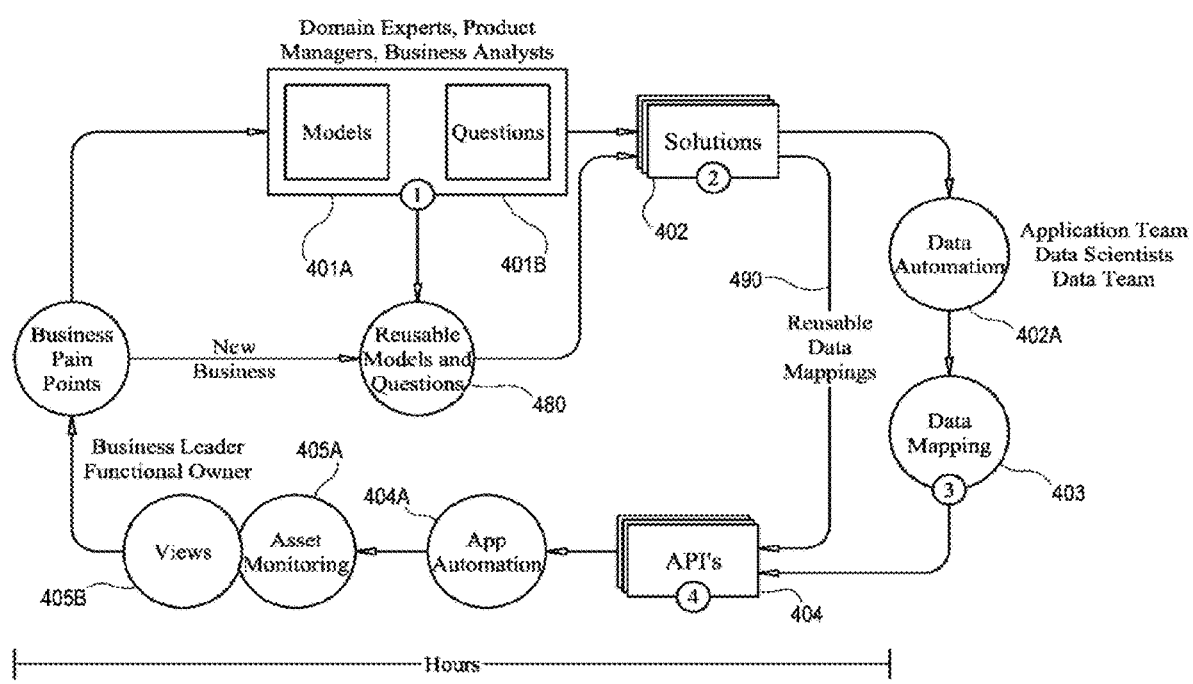
FIG. 4B illustrates the sequence of actions of FIG. 4B in view of reusability in accordance with some implementations.

One aspect is that the process of FIG. 4A becomes more efficient with extended use. FIG. 4B shows the acceleration of the process over time as more and more questions are created in the system. In many business scenarios, there is a high degree of overlap between questions requiring the same properties and data as many other questions, such that there may be reusability of some data mappings 490. In practice, this means that over time each subsequent question will require less and less of its data needs to be mapped, as this work has already been done for previous questions. While the first question in a new instantiation of the system always requires 100% of its properties to be mapped to data, over time this number drops, greatly accelerating the process by bypassing the mapping step. Similarly, once models and questions have been built for one organization, there is great potential for reusing the models and questions 480 for other organizations because the models are tied to domains that business' have in common, not to details of underlying data systems.

Figure 4C:
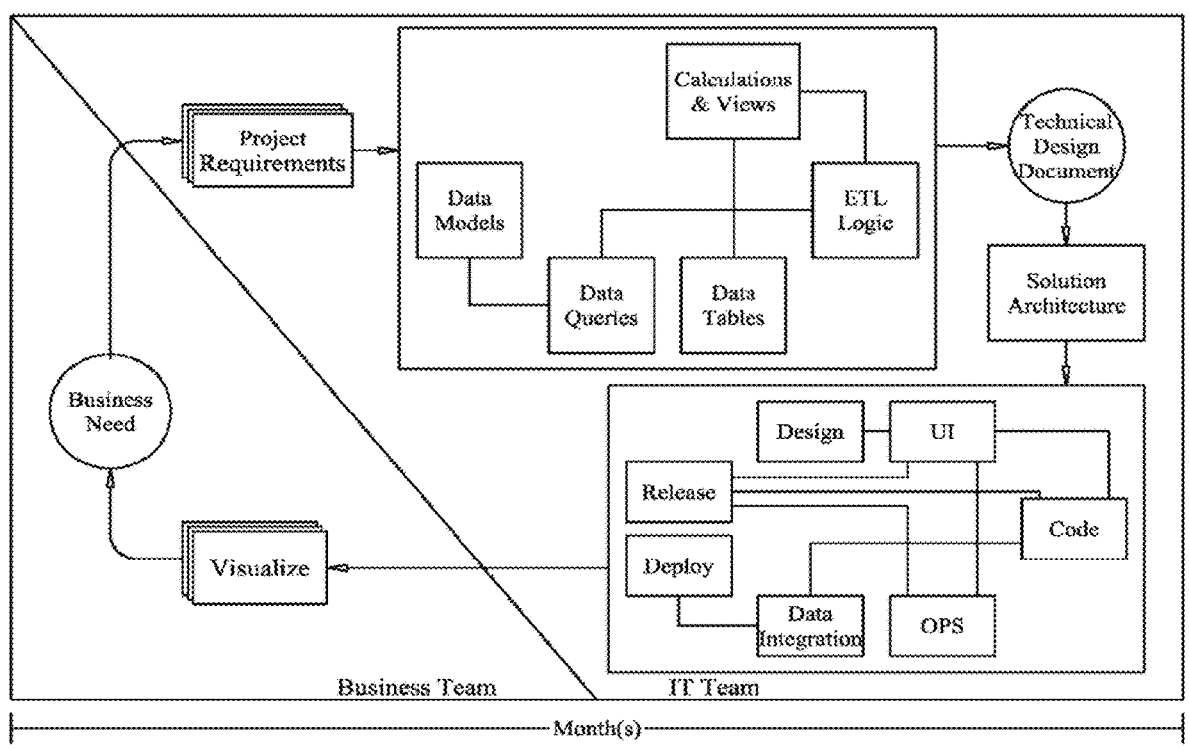
FIG. 4C illustrates a comparison with a conventional approach.

In contrast, FIG. 4C shows a more conventional approach to answering questions based on data. It requires data engineering which is not reusable and may potentially need to be completely reworked as new questions are asked of the same data. This approach also relies heavily on highly technical software developers, and as such requires that the requirements of the business users (the question itself) be carefully documented to facilitate handing off. This is time-consuming, prone to error in the handoff, and only minimally reusable.

Returning to implementations of the present disclosure, a UI tool may be used to aid non-programmers to build domain models. In some implementations this strategy for Decision Intelligence puts tools in the hands of domain experts (i.e., non-programmers) to build a model of their assets and adjacent processes using graphical tools that empower them to add connections on quickly. This approach allows a quick transition between data and value by allowing machine experts to focus on small, contained use cases and grow the scope of their model's capabilities over time. After developing this intuitive model, generating use-case specific queries is similarly done graphically culminating in a one-click deployment of these queries as API's for applications, dashboards or other tools to consume.

The UI may be implemented in different ways. In some implementations, different user interface views are supported, such as a model view, a question view, a solution view, and a query view. As one example, a query catalog may be populated with pre-existing questions, organized by a source model. For example, a UI may guide a user through the decision-making process of re-using existing questions and/or models versus creating new questions and/or models.

In some implementations, radial visualizations are generated for domain models. For example, each node in a radial visualization may represent a domain model, along with link relationships between them. In some implementations, after selecting a particular model concept, pop-outs show all associated properties, including those added via inheritance relationships with other concepts.

In some implementations, radial model visualization also supports editing.

UIs for creating new questions may, for example, guide a user through the process of creating a new question, selecting a source domain model, and picking concepts, relationships and properties to compose the query. For example, a user may be asked to search a domain model in a form and ask a question in a query view, followed by selecting concepts from the model and adding properties and connections to answer the user's questions.

In some implementations, data is connected to a question via a UI guided data mapping processing. For example, a UI may support selecting concepts of a model, searching properties, and selecting map settings. For example, the map settings may define a type of mapping, a data set, and a mapping column.

In some implementations, property mapping is performed individually for each property including in a question. This may include a first step of mapping a question property by selecting a field (column) from a dataset to populate the property's value. A second step of mapping a question property may include selecting a field (column) from the dataset to facilitate linking the parent concept instance. Of course, before the mapping can begin, data sources need to be connected and configured.

In some implementations, a UI supports a user adding new concepts to a new or existing model.

In some implementations, user interfaces support configuring access privileges.

In some implementations, a 1-click process supports the deployment of questions as APIs.

Figure 5A:
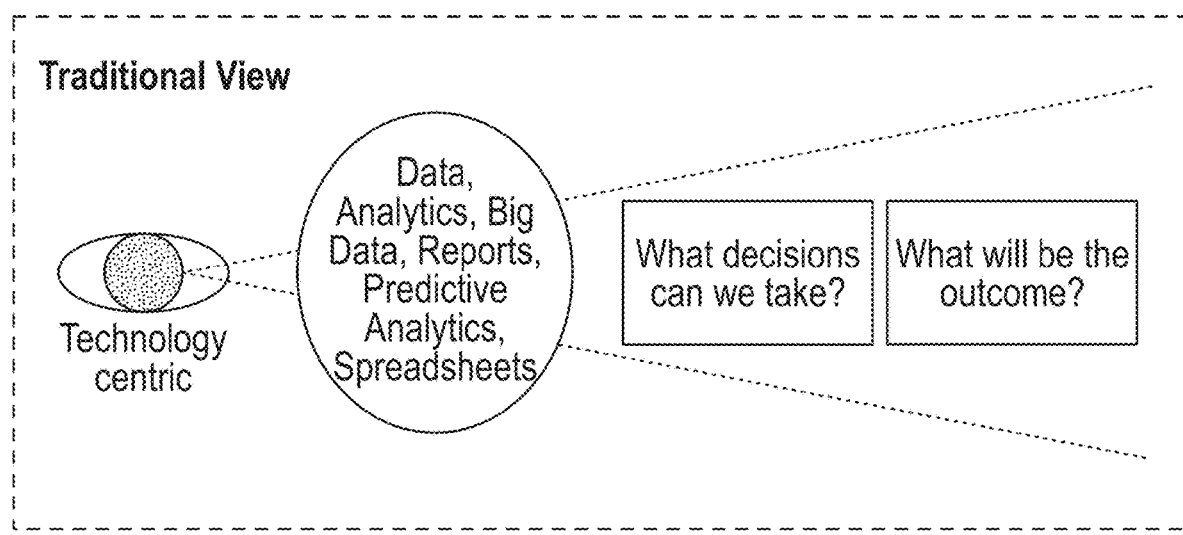
FIGS. 5A and 5B illustrate a comparison between a traditional view and a decision intelligences view, respectfully, in accordance with some implementations.
Figure 5B:
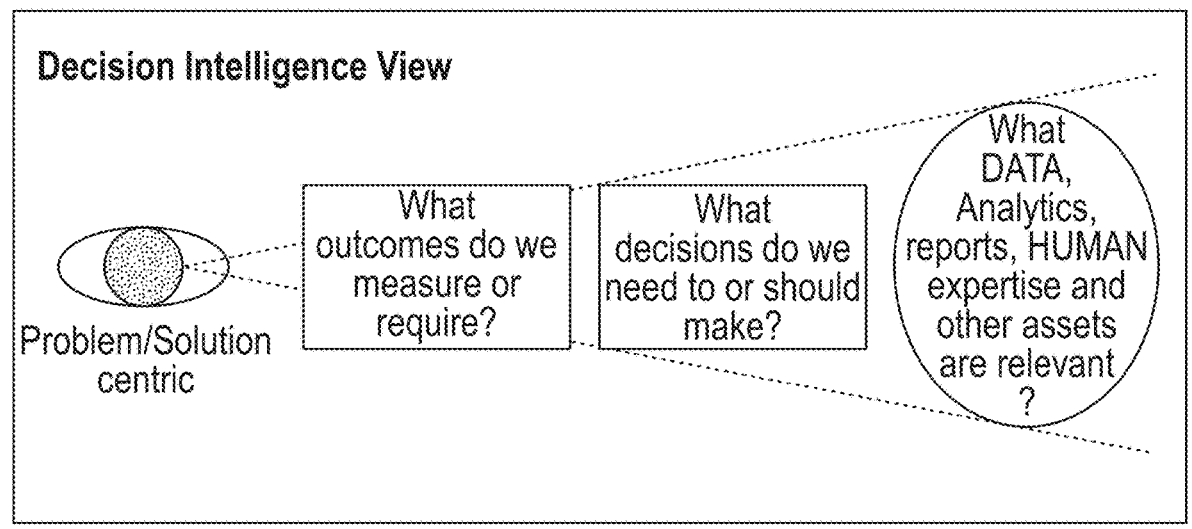

Some of the differences between the Decision Intelligence System and conventional decision intelligence systems is illustrated in FIGS. 5A and 5B.

FIG. 5A illustrates the how in traditional decision intelligence the Data Lake is formed and an ontology generated from the Data Lake. From the automatically created ontology, conventional analytics are performed. Within that framework, users determine what decisions they can make, followed by determining the outcome. A drawback of the traditional technique of FIG. 5A is that knowledge model/ontology is based from the schema and/or data of underlying source systems, which results in ontologies that are not aligned with a subject matter expert's view of the domain in question, reducing the effectiveness of the ontology. For example, FIG. 5A illustrates that the initial raw analytics was generated without regards to the decision and outcome.

FIG. 5B illustrates how in some implementations of this disclosure, a data expert builds a knowledge model that defines an ontology based on the outcomes and decisions required by a business knowledge model. This then, in turn, can be used to determine data, analytics reports, and other information required. Thus, the ontology is aligned with the subject matter's expert's view of the domain in question, improving the use of the ontology.

FIGS. 5A and 5B illustrates the contrast between initiating the decision-making process with a clearly defined decision that needs to be made, versus the traditional approach that starts with data.

Knowledge Model Mapping to Data Sources

Referring back to FIG. 4, UI interfaces may be provided to support data experts to formulate questions, create business knowledge models around the questions, create solutions, perform data mapping, and generate APIs. Some aspects of knowledge model mapping to data source will know be described.

1. Mapping Strategy

Figure 6:
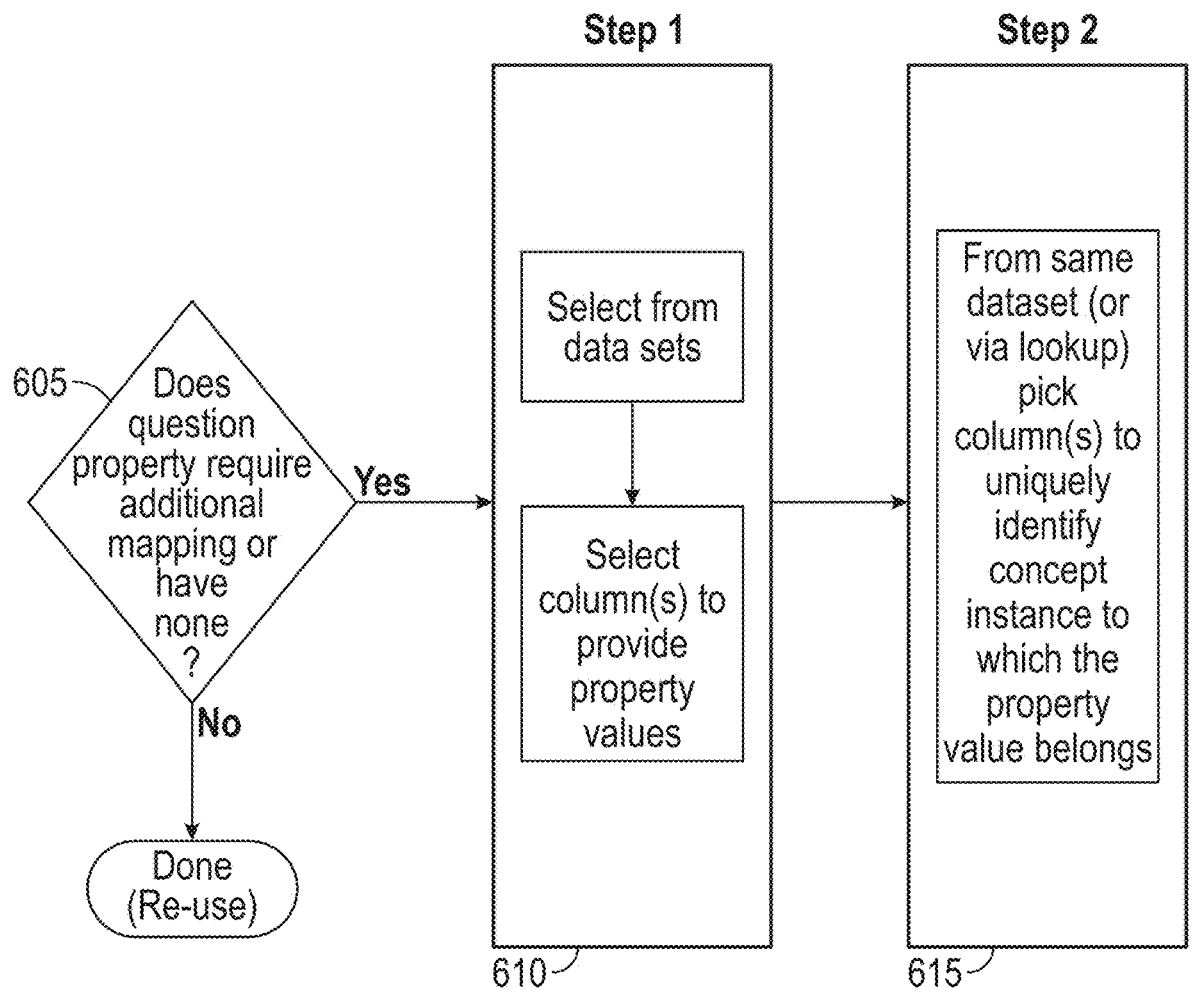
FIG. 6 illustrates a two-step mapping process in accordance with some implementations.

In some embodiments, a mapping strategy, which may be supported by a UI, supports knowledge model mapping to data sources. FIG. 6 illustrates an example of a mapping strategy in accordance with some implementations.

As an initial precursor, a decision is made in decision block 605 whether a question property requires additional mapping or not. If no, the process is complete. If yes, in a first step 610 a selection is made from data sets to select columns to provide property values. In a second step 615, columns are picked to uniquely identify a concept instance to which the property belongs.

GUI interface may include a data mapping UI to support the mapping strategy. In one embodiment, mapping is a drag and drop operation for relating source data to concepts and properties of the model. Specifically, a user drags columns from source tables, and drops them onto properties and concepts in queries built on top of the model.

The queries are the queries that the user builds to read/write data in outcomes they build on top of the model. In this process:

Mapping is driven by the outcome-driven query authoring process, limiting mapping activities to those with immediate value, and No additional user labor will be required in authoring queries solely for mapping.

Additionally, in one embodiment of the Decision Intelligence System, a simplification is chosen that the queries used for mapping are the same queries used for API building. In fact, the outcome driven API process drives the mapping process.

The result of the mapping may be stored in a mapping file of mapping engine 315 in the Decision Intelligence Platform 305 that describes the data mapping.

2. API Driven Mapping Approach

Figure 7:
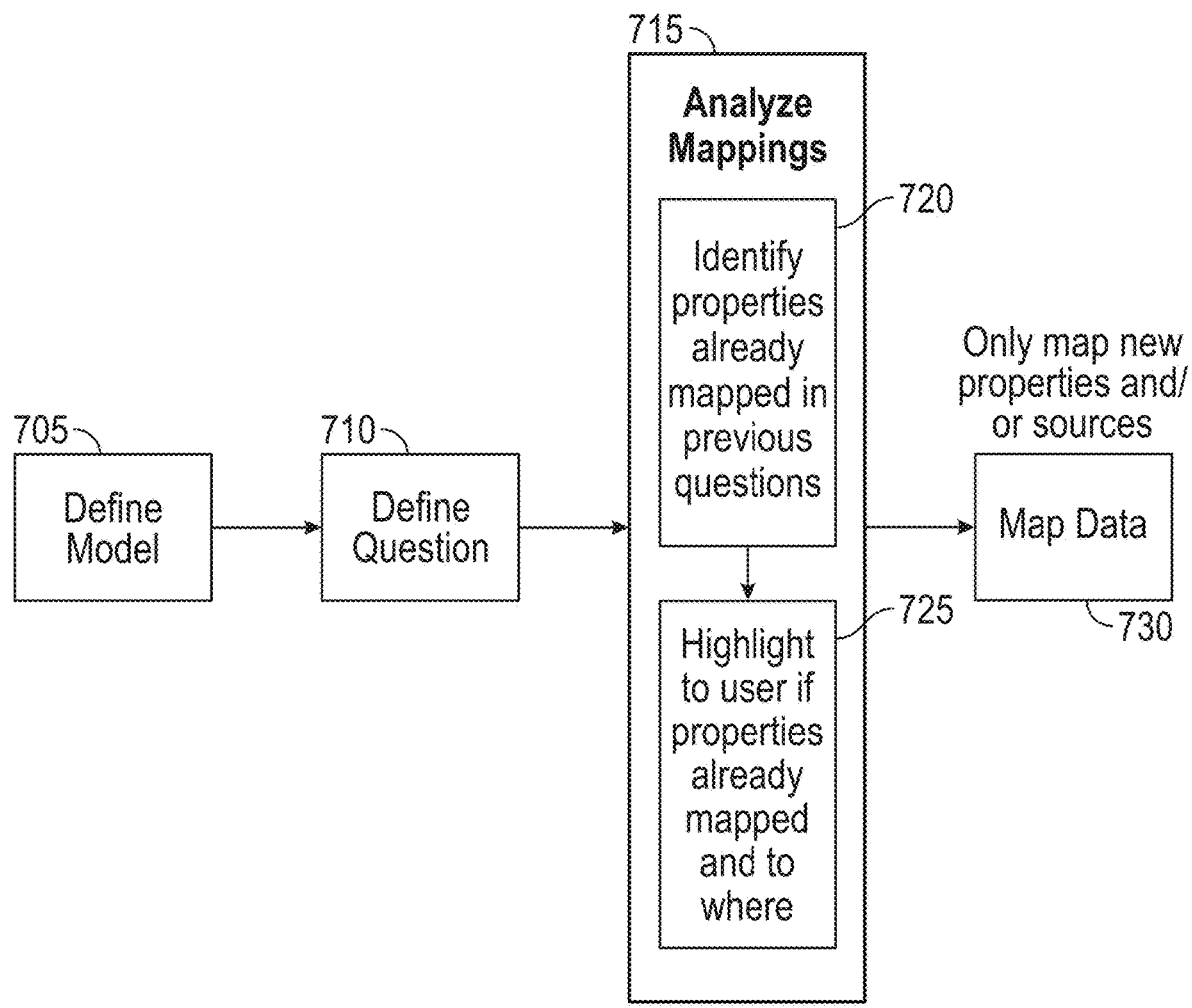
FIG. 7 illustrates an API driven mapping process in accordance with some implementations.

FIG. 7 is a flowchart of an API driven mapping approach in accordance with an embodiment. A business model is defined in block 705 and questions are defined in block 710.

The intermediate step 715 analyzes mapping. In block 720, properties are identified that are already mapped in previous questions. The user is shown in block 725 if the properties have been previously mapped and to where.

In some implementations, data is mapped 730 only for new properties and/or sources.

In some implementations, models and queries are reusable objects that can be applied to different organizations and use cases. When a model is instantiated for a particular use case (and gets a use-case specific dataset ingested via mapping) the resulting bundle of model+dataset is defined as a Solution.

Similarly, in some implementations, API's are the result of instantiating a query against a Solution Mapping is a means by which the system get data into a Solution, so it is tied to objects associated with the Solution. The provisioning of an API against a Solution kicks off the need for mapping to get data into a Solution.

Every time an API is provisioned, the Decision Intelligence System needs to recognize if it does not have all the data needed to fulfill it. If this is the first API provisioned against a Solution, then the Decision Intelligence System definitely does not have the data. In this edge case, the Decision Intelligence System can give the user the query behind the API and ask the user to map it. In the other extreme, if the Decision Intelligence System has a large number of APIs provisioned against a solution, then additional source data may not be required. However, more commonly there will be intermediate cases in which an analysis needs to performed whether data mapping is required. This process can be called. "Mapping Analysis." In some implementations, the Mapping Analysis generate the maps the user should fill out, based on i) maps that already exist, and ii) the queries behind the API's. As an illustrative example, instead of asking for 100% of a new API's query to be mapped, it may only need 50% based on the likelihood that 50 previous mapping exercises have covered the same ground.

In some implementations, a mapping process, described in detail below, supports a user mapping knowledge model concepts to source data, regardless of the source schema. That is, the structure of the model doesn't need to match the structure of the source schema (i.e. tables in the case of a relational source DB).

In this embodiment, each property is mapped to a field in the source schema directly, and each time the user is prompted to select a second field from the same row linking the property instance to the concept instance. In this way, properties for a given concept can be mapped from multiple tables. Facility is also made to align concept identifiers between sources.

An example mapping process consists of two steps, and was described by FIG. 6.

3. Example Basic Mapping Process

Figure 8:
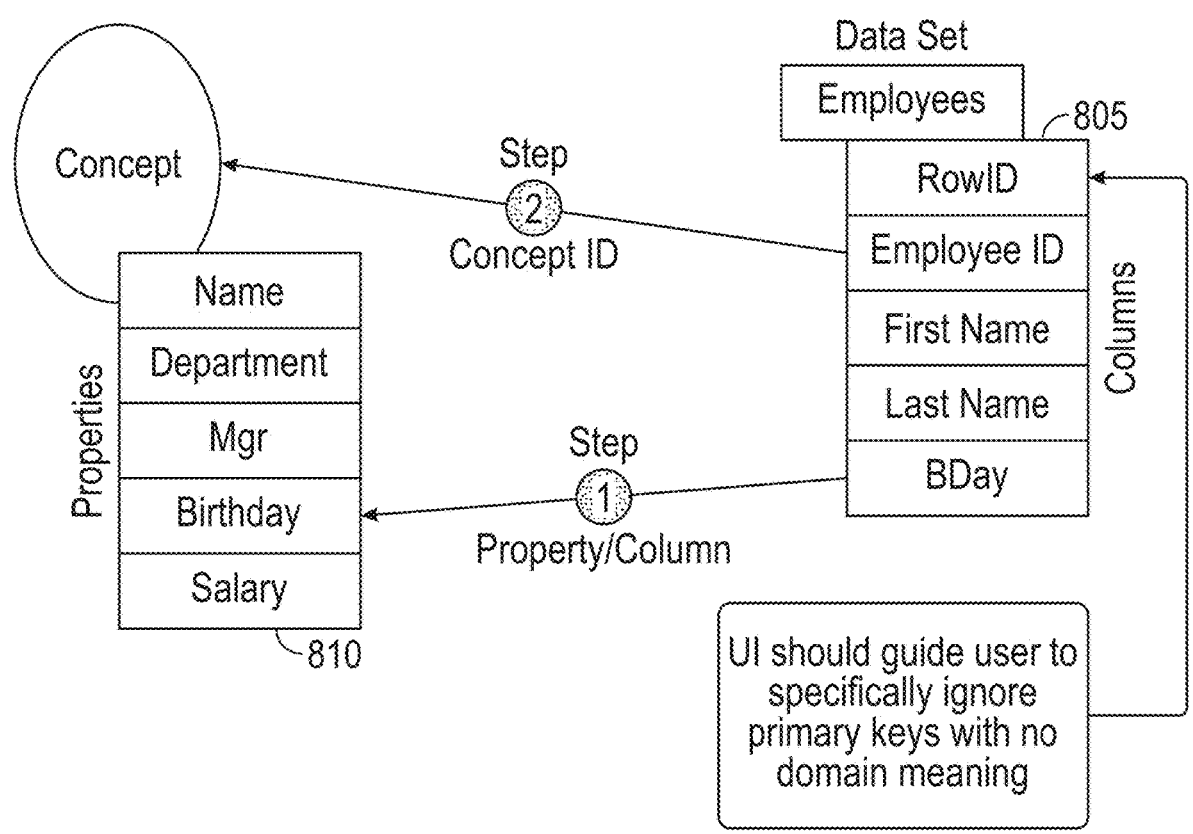
FIG. 8 illustrates a UI guided mapping process in accordance with some implementations.

FIG. 8 illustrates examples of how the UI may guide the user in a data mapping process.

In the example of FIG. 8, items in columns of a dataset 805 are mapped to concept properties 810 in a model. The user may be prompted by the UI to guide them in the mapping. For example, the UI may guide the user to make selections consistent with domain meanings. FIG. 8 also illustrates the 2 steps of the 2-step data mapping using a UI. In particular, step 1 correspond to a selection of at least one column from a selected dataset to provide property values for the selected data set. Step 2 corresponds to picking at least one column to uniquely identify a concept instance to which the property values belong.

In the illustrated example, suppose a user wants to map the Birthday property in the model to the BDay column in the Employees source table. In this example, a user can drag over the BDay column, but which employee is each birthday for? In one embodiment, the user is prompted to tell how the record/row in the database relates to the Employee concept in the model. For example, the user may be prompted to indicate how each employee is uniquely identified in the Employees table. In this case, the prompts aid the user to interact with the Decision Intelligence System to pick the Employee ID column.

4. Mapping Process with Functions to Adapt Source Fields

Figure 9:
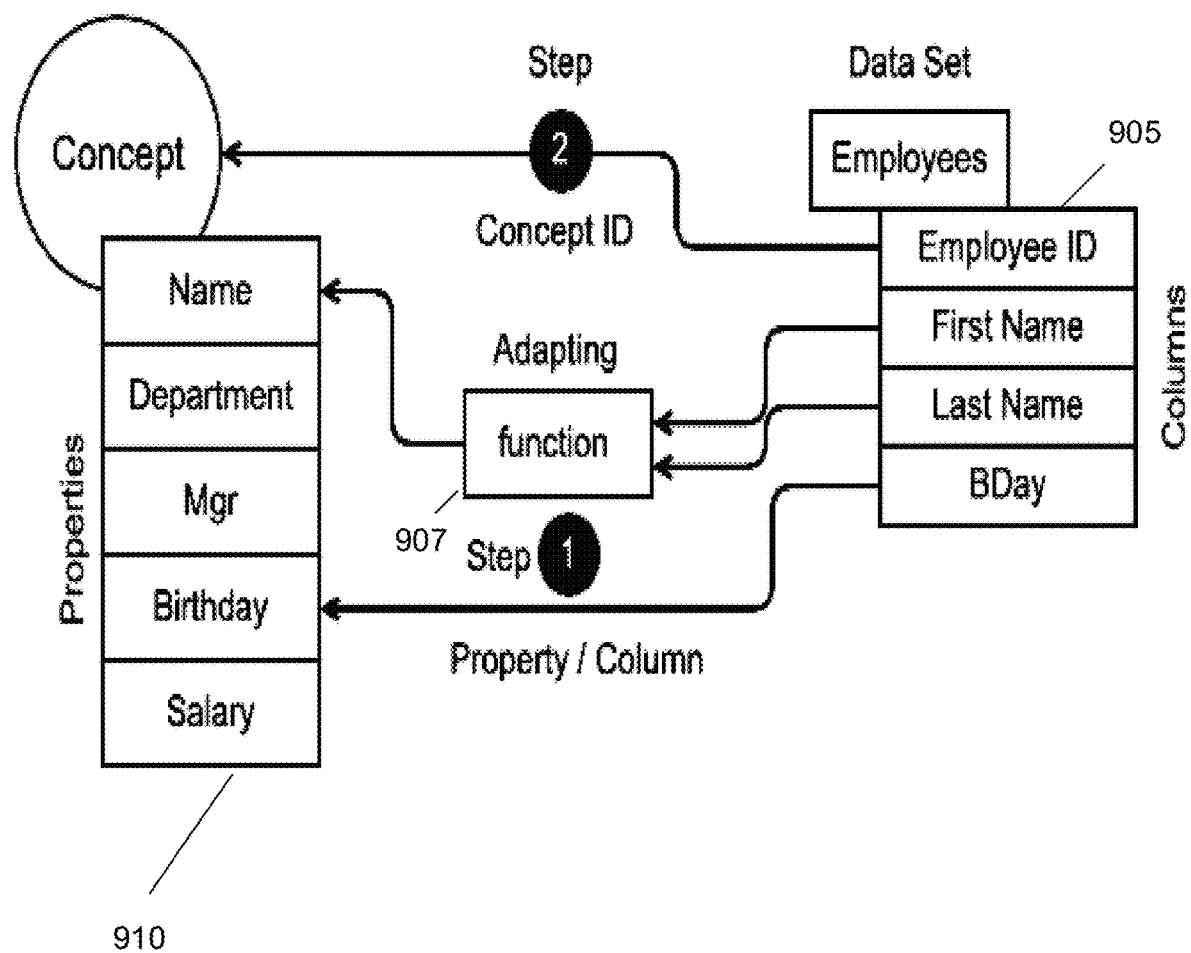
FIG. 9 illustrates a variation of a UI guided mapping process with functions to adapt to differences in source data in accordance with some implementations.

FIG. 9 illustrates an example of functions to adapt source fields in a data set 905 into the proper format to suit ingestion into the model concepts 910 in accordance with an embodiment. FIG. 9 also illustrates the 2 steps of the 2-step data mapping using a UI. In particular, step 1 correspond to a selection of at least one column from a selected dataset to provide property values for the selected data set. Step 2 corresponds to picking at least one column to uniquely identify a concept instance to which the property values belong.

A decision intelligence system generally cannot assume that source fields contain data in the right format to suit ingestion into the model. Fields may need to be combined, split, etc., to suit the meaning of semantic properties. In the illustrated example, we need to combine the First Name and Last Name column entries with a simple concatenation in step 1 to fulfill the Name property in the model. However, in the more general case, other functions 917 may be required.

Some example functions include, but are not limited to:

Concatenate

Split

Upper

Lower

Constant

Lookup Table

Hash

Mapping Process with Joining

Figure 10:
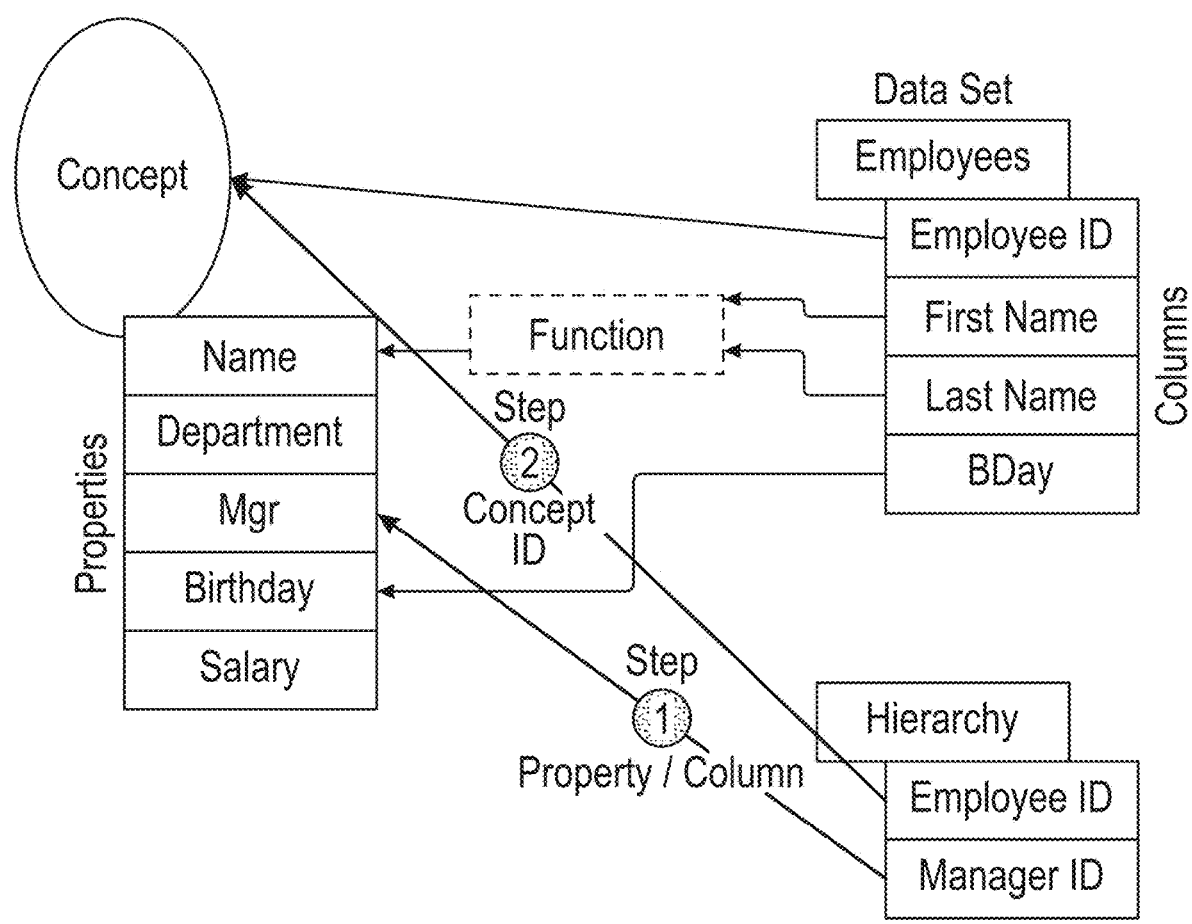
FIG. 10 illustrates a variation of a UI guided mapping process with hierarchies in accordance with some implementations.

FIG. 10 illustrates an example of joining information from different source tables in accordance with an embodiment. Not everything to map a single concept will be available in a single source table. In the illustrated case, a Hierarchy table is used to map the Mgr field in the model. As before, the user is prompted to indicate how each row is related to the Employee concept. In this simple example, both tables happen to have an Employee ID column. FIG. 10 also illustrates the 2 steps of the 2-step data mapping using a UI. In particular, step 1 correspond to a selection of at least one column from a selected dataset to provide property values for the selected data set. Step 2 corresponds to picking at least one column to uniquely identify a concept instance to which the property values belong.

This time, when the user specifies that the Employee ID column identifies the Employee concept, the system recognizes that the concept has already been mapped to another identifier from another table. It must now engage the critical step of making sure the identifiers are aligned. Critically, in this case, the Employee ID columns in both tables contain the same space of identifier. (That is, a simple SQL could be run to join and equate them and join the tables.) However, this will not always be the case, but in this case after prompting the user to confirm it, no more effort is required.

Another in the example of FIG. 10 is that type of the property Mgr is Employee. That is, instead of a literal value like Name or Birthday, it is a relationship edge pointing to another instance of Employee. For the situation of a relationship edge, the prompting may be modified.

For example, in this example we find another place where the Employee concept has been identified by the Mgr edges pointing to it. The prompting to the user is selected to ensure that the identifier values that are mapped into the Mgr property from the Manager ID column overlap with the Employee ID columns already mapped to instances of the Employee concept.

5. Mapping Process with Disjoint Identifiers

Figure 11:
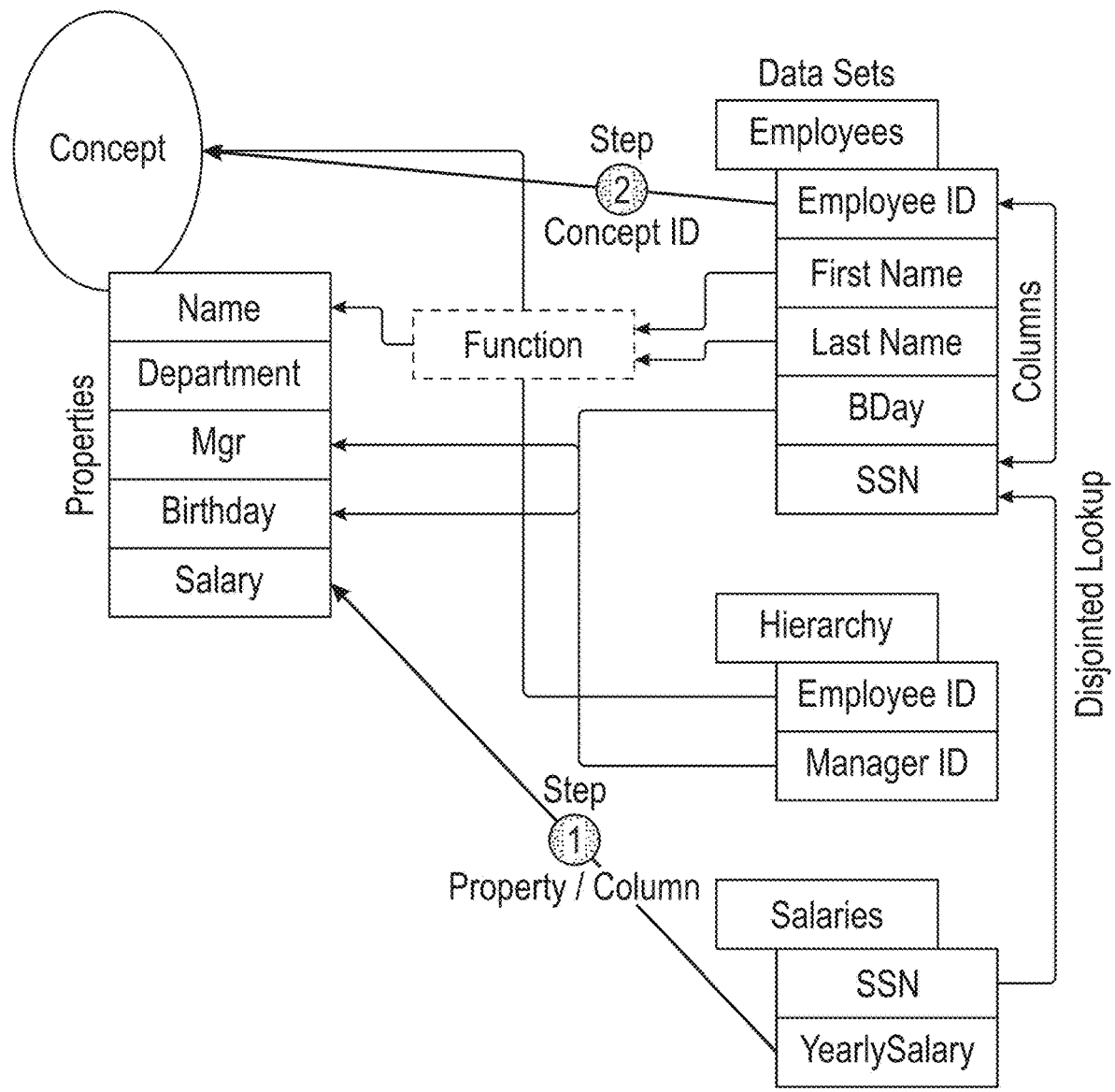
FIG. 11 illustrates a variation of a UI guided mapping process with disjoint identifiers in accordance with some implementations.

FIG. 11 illustrates an example of disjoint identifiers in accordance with an embodiment. In Some examples, the identifiers across different source tables overlap. However, in some cases the identifiers across different source tables won't overlap. For this case, disjoint identifiers can be used in the mapping process. FIG. 11 also illustrates the 2 steps of the 2-step data mapping using a UI. In particular, step 1 correspond to a selection of at least one column from a selected dataset to provide property values for the selected data set. Step 2 corresponds to picking at least one column to uniquely identify a concept instance to which the property values belong.

In the example of FIG. 11, the Salaries table uses a different SSN column to uniquely identify employees. In this case, as in earlier examples, in response to adding the YearlySalary column the Decision Intelligence System prompts the user to pick a column from the same source table to identify the Employee concept. When the user drags over the SSN column, the system prompts them to decide whether it overlaps with the existing identifiers assigned to the Employee concept. In this example, it does not. So, the user is prompted to help cross-reference these identifiers. In one example, there is the identifier range 1: employees.employee id=hierarchy.employee id=hierarchy.manager id. In this example, there is also the range 2: Salaries. SSN.

In one implementation, a pointing is required to two columns in any single source table that relates them. In the illustrative example, the SSN column in the Employees table makes this work out. In this case, we find what we need in the Employees table. In general, it could be some completely separate look up table that only exists for this purpose, or some other source table that hasn't been mapped at all yet.

Derived Value Time-Series Calculations

1. Overview of Time Series Calculations for Asset Relationship Management

The Decision Intelligence System can be applied to Asset Relationship Management (ARM).

A foundation of ARM is that there is typically continuous monitoring of time-series machine data. These values typically represent the output of physical sensors on the equipment. As a non-limiting set of examples, the time-series machine data could be the output of physical sensors such as temperature via a thermocouple, fluid flow via a turbine flow meter, etc.

However, these time series sensor values in their "raw" state may not represent good indicators of machine performance. Sometimes, one or more of these raw measurements can be combined via a simple calculation to produce a derived value that has more value to users. A classic example is temperature correction. For example, volume measurements fluctuate with temperature. As a result, a volume measurement may be temperature corrected to improve the accuracy of the volume measurement. For example, consider fuel storage. If the sensor data includes a "measured flow" to a storage container and a temperature, the two sensor data inputs can be used to create a temperature corrected measured flow.

In some implementations, the Decision Intelligence System 200 calculates derived values when new values for their inputs become available in ingestion, and stores the result in the time-series store in exactly the same way as direct sensor measurements. This means the compute load happens on ingestion, and queries don't have to wait for the calculation to be executed. For queries, it is transparent whether the values being retrieved come from data collection, manually entered or derived. Further, the Decision Intelligence System parameterizes inputs and outputs using a tagging system. This allows the calculations to be attached to digital representations of physical assets automatically (finding appropriate inputs and outputs among the standardized options for a given asset type), instead of requiring that each derived parameter be configured individually. In this way, it is possible to configure a new calculation for an existing asset fleet and deploy it to all assets in a single step.

Figure 12:
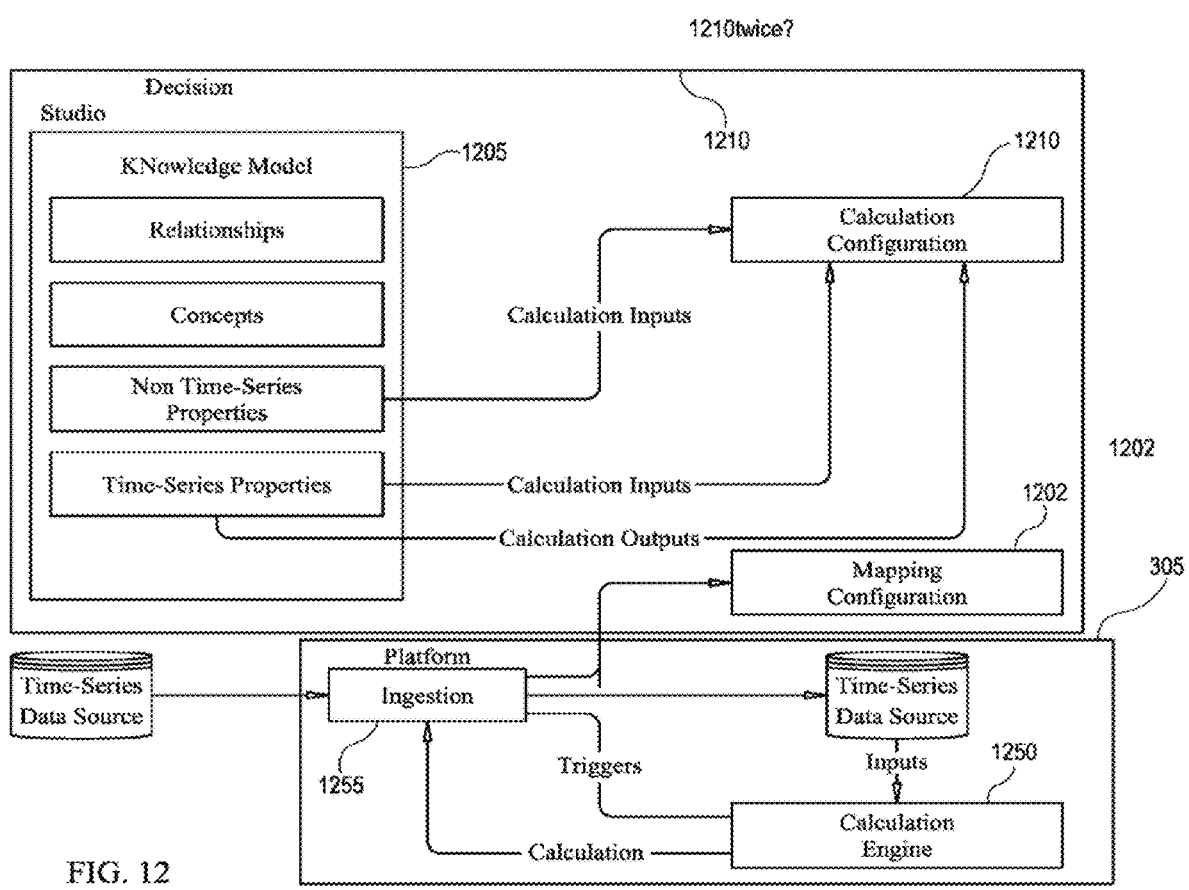
FIG. 12 illustrates aspects of calculation configuration for time series data in accordance with some implementations.

FIG. 12 illustrates an implementation of the Decision Intelligence System that supports time-series calculation. FIG. 12 illustrates the elements of a calculation configuration 1210 and their relationship with other logical components of Decision Intelligence Studio 250 and the Decision Intelligence Platform 305.

A knowledge model 1205 generated in the Decision Intelligence Studio 250 includes relationships, concepts, non-time-series properties, and time-series properties. A calculation configuration engine 1210 configures elements of the calculations performed by a calculation engine 1250.

A time series data source is ingested in an ingestion module 1255. The ingested time series data source is used to generate triggers for the calculation engine 1250. The ingested time series data source is input to a time series data store, which provides inputs to a calculation engine. An output of the calculation engine 1250 may then be ingested. An output of the ingestion model is provided mapping configuration 1202.

2. Basic Calculation Configuration

In some implementations, the most basic configuration element required of the calculation configuration 1210 is the calculation itself. While all calculations may have one or more inputs, they can be divided into two general classes based on whether they have one output, or more than one output.

Single-valued calculations (of the form $y=f(x1, x2, \ldots)$) are simpler to conceptualize and fulfill the expectation we have of a "derived value". Multi-valued calculations (of the form $(y1, y2, \ldots)=f(x1, x2, \ldots)$) are sometimes required when the calculation itself has multiple steps and efficiency dictates that it makes sense to generate multiple outputs together.

Multi-valued calculations tend to elevate the configuration of their deployment beyond the traditional ARM scope of configuring asset, parameters. That is, the calculation deployment itself becomes a configuration step.

Some ways to avoid these complex calculations include building redundant (less efficient) single-valued calcs for each output, chaining together single-valued calcs (output of one is a trigger for another), or deciding to take the analytic itself out of the derived-value path (on ingestion) and deploy it to a higher-level analytic system (i.e., calculate it at query time).

Regardless, in some implementations, the Decision Intelligence System defines a language to use in defining a calculation. This permits the details of the arithmetic itself to be specified. Several options are possible that impact the implementation strategy, but leave the logic of configuration largely unchanged. Some of these options include:

Visual notation whereby blocks can be dragged and dropped together to construct an equation.
   Definition of a parsable language specific to the Decision Intelligence system to implement basic math features.
   Selection of an existing programming language to serve as our mode of definition. This has the benefit of allowing the import of existing math libraries to enable powerful calculations in a single line.

In one implementation, calculations are configured as reusable objects. A single calculation may be reused across many assets/parameters by simply having its inputs (arguments) remapped to appropriate local parameters.

An example set of configuration properties include a name, expression, and output type. The name is the name of the calculation as referred to in the UI. The expression is the mathematical steps required for the calculation. The output type is the type of parameter that the output is bound to. An example set of configuration properties is provided in the table below:

| Configuration Property | Description |
| --- | --- |
| Name | Basic name of the calculation; how it is referred in the UI. |
| Expression | Definition of the math steps required for the calculation. (Options for this described above.) |
| Output Type | Describes the type of parameter the output is bound to |

3. Asset Type Templates and Parameter Tagging

In some implementations, all output values from calculations have a parameter type assigned to them. As an illustrative example consider the example that a calculation returns a "temperature corrected flow." In this example, the output value of a temperature correct flow needs to be associated with model parameters whose unit type is "flow".

In some implementations, the minimum "typing" is an assignment of the relevant unit type. However, the association of output values with parameter types may be continued to whatever granularity is supported by parameter typing in the asset model.

In some implementations of the Decision intelligence system, a "Micro Model" concept describes the structure of an asset type template and their various parameter types. In this context, "micro" refers to modelling details within an asset. It can be said that a class of assets are fundamentally defined by the characteristic parameters and properties they share.

Micro-modelling can also be called templating, as it provides the model to be "stamped out" every time we instantiate an asset of a given type. Any asset tracking or monitoring system deals extensively in properties or measurements (parameters) of the assets themselves.

For example, consider an example of tracking a fleet of assets, each belonging to one of several asset types or classes (e.g., perhaps Gas Turbines, or Cooling Towers, or even as specific as a product type or model number). In this case, the Decision Intelligence Systems expects that assets of the same type have some degree of overlap in terms of common properties or parameters. In some standard products, the overlap may be near 100%; in highly custom engineered equipment, the overlap is still likely as high as 50%. A totally naive approach might require a user to manually type the name of each parameter every single time they configure a new asset.

A slightly more sophisticated approach might involve each asset type having a template of parameter names that get automatically populated when a new asset is configured. But there is value in going further, to represent similarities between parameters to a maximum degree.

Some additional details for asset type templates and parameter tagging are described below. Some benefits include:

Sorting of parameters within a complex asset. (e.g. "show me all the temperature" or "show me the inlet conditions")
   Continuity across assets dramatically improves reusability of analytics built on asset data.
   Analytic inputs using pattern matching so that substitute parameter may be employed.
   Solution to the so-called "sparse telemetry" problem where individual assets lack complete telemetry, but may have it inferred by understanding relationships to other assets' telemetry.
   Multi-dimensional approaches to parameter typing eliminate an unwieldy one-dimensional list.

Note that if a user had to come up with a name for an asset parameter, they would have to include enough information to uniquely differentiate the parameter from all others. The same can be said for categorizing. In some implementations, the Decision Intelligence System categorizes parameters in enough detail so that they can be uniquely identified. However, it is desirable that the configuration of the system does not become inefficient by requiring too much user input.

Some examples of useful things to categorize include:
   Unit Domain—Is this parameter a pressure, a temperature, a currency, etc.? This one is pretty hard to avoid.
   Zone—This has been previously called "location" or "sampling point", but it refers to a WHERE within an asset.
   Object—What are we measuring or describing? This may refer to an equipment component, a substance moving through an asset, or something else.
   Redundancy—Is the same quantity being measured twice? Or are these parameters actually different but our categorization doesn't go far enough?

Unit Domain and Redundancy will tend to have a global implementation and enumeration for all asset types. However, it should be clear that Zone and Object are heavily asset type dependent and enumerations for each should be setup for each asset type.Category: Unit Domain.

There are basic types of measurement that are universal enough and so commonly used in ARM that they can be understood as units-of-measure that belong together and can be converted between. For example:

Temperature
Pressure
Viscosity
Mass
Force
Volumetric Flow
Mass Flow
Concentration
Velocity
Currency
Unitless Without this basic information, it is difficult (even impossible in some cases) to make sense of the value a parameter might have. (30 degrees ° C. and 30 degrees ° F. are very different temperatures.) As such, in one embodiment, the mandatory metadata for each parameter.Category: ZoneAssets can be complex, but the concept of a zone can help to break them down into manageable chunks.

Creating a list of zones for a given asset type can often be as simple as asking "where am I measuring on this asset?" "Where" can be stretched, however, if the asset type warrants it. For example, we might consider physical locations (North Side, South Side), physical interfaces (inlet, outlet), or even process step (maintenance mode, production mode) as zones (i.e., where in time). The concept provides a bit of extra context to each parameter, but becomes very valuable (and necessary) when similar measurements are carried out in different zones. For a Reverse Osmosis membrane module, for example, the flow rate (of water) is measured at each of the "feed", "permeate", and "concentrate" interfaces.

Treating each of these as zones is a clear and repeatable way to differentiate the measurements (and ensure they are used appropriately in analytics, for example). Category: ObjectSimilar to zone, the concept of categorizing based on "object" helps reduce the complexity of complex asset types. Object often refers to a piece of sub-equipment within an asset, or a substance flowing through an asset.

For example, inside a steam turbine asset, within Stage 1 (a zone) there may be monitoring of the temperature of both fuel and steam. By considering steam and fuel as two objects, the system is able to categorize these two parameters (which mean two very different things) separately. If an object is a piece of sub-equipment (like a bearing or pump), the system might notice an overlap with similar concepts within a Bill of Materials (BOM) for the asset. These are not necessarily one and the same. This is really looking at "monitored object" in the context of an ARM app. This may bear little resemblance to how the equipment is broken down in its engineering BOM. For that matter, a customer may not have integrated their BOM's with the Decision Intelligence system, but still needs to categorize parameters effectively.

Thus, the chart above can expand on the Output Type by linking it to applicable parameter types. Instead of selecting Parameter Types from a pre-defined tree of all possible options, we can selectively apply the fragments Zone, Object and Domain as tags attached to each parameter type. This has a few benefits, such as:

No need to build/vet the entire tree up-front
Less complex assets can use only partial sets of tags . . . Object, but no Zone, for example. Domain is always mandatory.

Similar Object/Domain combinations can be made common across different asset types, even where the Zones differ greatly.

| Configuration Property | Description |
| --- | --- |
| Name | Basic name of the calculation; how it is referred in the UI. |
| Expression | Definition of the math steps required for the calculation. (Options for this described above.) |
| Output Tags | Mandatory Unit Type Tag, Optional Zone and Object tags. |

4. Calculation Arguments

In the expression of the calculation, the author will naturally include variables which the system interprets as required inputs to the calculation. For example, consider the following expression: "tempCorrectedFlow=temperature*someConstant*measuredFlow" (an illustrative example). In order to execute this calculation the system needs to provide values for temperature, someConstant, and measuredFlow. In the ARM context, this means the system binds these to asset model parameters or provide a static value (in the case of the constant).

In some implementations, these variables are referred to as "arguments". Recall that we desire these calculations to be reusable across many assets and parameters. So, when the system binds arguments, the system will not assign them to a fully qualified identifier for an instance of a parameter. (i.e., Cooling Tower 123 Temperature Sensor D). Instead, the system provides enough specification so that the argument requirements for a calculation can be dynamically bound to any asset where the calculation is deployed.

To do this, in some implementations the decision intelligence system uses a similar form of logic as described above for calculation typing. For each argument, the system defines a parameter type (or set of parameter types) to an arbitrary level of detail. For the tempCorrectedFlow example, it may not matter where the temperature comes from in the sense that almost any temperature parameter will do for generating a correction to the flow. In that case, only that unit type=temperature needs to be specified. However, measuredFlow is typically more particular because of the importance of accuratelyknowing the flow through the nozzle. In that case, a specification for the measuredFlow argument is that its unit type=flow, and also that the zone=nozzle.Triggers. As stated above, in one embodiment, these calculations are executed when new values are seen for their input values.

For tempCorrectedFlux, a new value may need to be generated every time a new sample for temperature comes in. However, there may not be a need to execute it every time the measuredFlow updates. As such, in some implementations, a Boolean configuration property is supported to define which arguments should kick off (i.e., trigger) an execution of the calculation.Model Scope, which dynamically identifies input parameters and how much of the model to use to make updates.

As a starting point, the single-valued calculations are deployed/instantiated against a specific, fully-qualified output parameter in the asset model. So, each instance of the calculation has that output parameter as an anchor to the asset model, and the search for argument parameters should be tied to that anchor. For example, should the system only consider parameters at the same asset as the output parameter? Parent assets? Assets at the same site?

If ARM had a fixed hierarchy of assets (Customer? Site? Asset), then having search options like "same location", etc., would be easy. However, since the Decision Intelligence System has a flexible asset model, the system needs to figure out how to specify an effective radius around for output parameter for the argument search.Temporal Scope.

For time-series arguments, the system needs to know how much data is needed, and over what period of time. Fortunately, again we have an anchor—the timestamp on the trigger value. Every calculation execution is kicked off by a single record for a parameter/argument that is defined as its trigger. This record has a timestamp which anchors us to a place in time. From there, a few properties define how much data to take in relation to that event:

Time Direction—forwards or backwards in time from the trigger time.
 Time Offset—step backward or forward in time from the trigger time before retrieving time-series data.
 Quantity—expressed either as an amount of time (minutes, hours) or a number of samples.

Putting these together, the system can be used to build constructs like this: "From the trigger time, give me the last 5 samples" or "From the trigger time, give me the samples from the day before". Multi-valued ArgumentsBased on the definition of temporal scope, there are a few potential cases for how much data we get back from the time-series store:

Can only ever be one value (quantity=1 sample)
 Will always be multi-valued (quantity>1 sample)
 Number of samples unknown (quantity expressed in time)

The calculation expression deals with this ambiguity. In the tempCorrectedFlux example, we are looking for single valued arguments only. In this case, if the specification is anything other than "quantity=1 sample", then the equation might be broken by passing it a list of values that it had no strategy for dealing with. But a strategy might be selected to smooth out the temperature values by taking the last five samples and applying some aggregate. The equation must be modified to deal with this—namely, the aggregate needs to appear: tempCorrectedFlux=average(temperature)*constant*flux.

5. Deployment

In one embodiment, calculations are deployed when they are associated with an output parameter(s). In an ARM configuration, templates for different asset types are provided and each has a list of parameter types that define that asset. For each parameter type, we define what type of data it is: time-series, derived, or manually entered. When it is derived, we can include the name of a default calculation to use to fulfill the parameter as part of the template. Thus, when a new asset gets created, often one or more calculations will need to be provisioned as well. If the calculation has been authored appropriately, no tweaking is necessary. But, as part of the configuration, some steps need to be taken in the backend, such as:

Trying resolving the argument configuration against the asset model to validate all inputs are available.
 Resolving tag names for any arguments defined as triggers, and register the triggers with the ingestion system.

6. Override Configurations & Adhoc Calculations

There will be cases where the default configuration for a calculation and/or its arguments is unsuitable or undesired. We may discover this when we try resolving the arguments and have it fail. Or, we may simply prefer more control over binding for a specific asset. Or, we may have an alternate calculation that makes more sense for a particular customer. In these cases, the configuration of a particular calculation instance (i.e., as deployed against a specific output parameter) can be modified to differ from the standard definition. Some examples of this override in action:

For a specific output parameter, selecting an alternative calculation from a calculation library. (User should get a list of all calculations that match the tagging requirements (unit type, zone, object) for the output parameter.
 Editing the text of the calculation for that particular asset
 Directly binding arguments to parameters of the asset, instead of relying on pattern matching via tagging.

Creating calculations and their configurations through a separate process, results in a reusable calculation library. This allows re-use across the fleet (setup efficiency) and also control over how key values are being calculated. However, there are cases where a quick and dirty calculation is required and setting it up as a standard calc in a library makes no sense. In these cases, we want the user to have a fast experience in whipping up a totally custom calc which is totally contained to the parameter in question. We can think of these as a 100% overridden configuration. Upon selecting the output parameter, the user defined the expression from a blank slate, and assigns fully qualified parameters to each argument.

7. Execution Strategy

Figure 13:
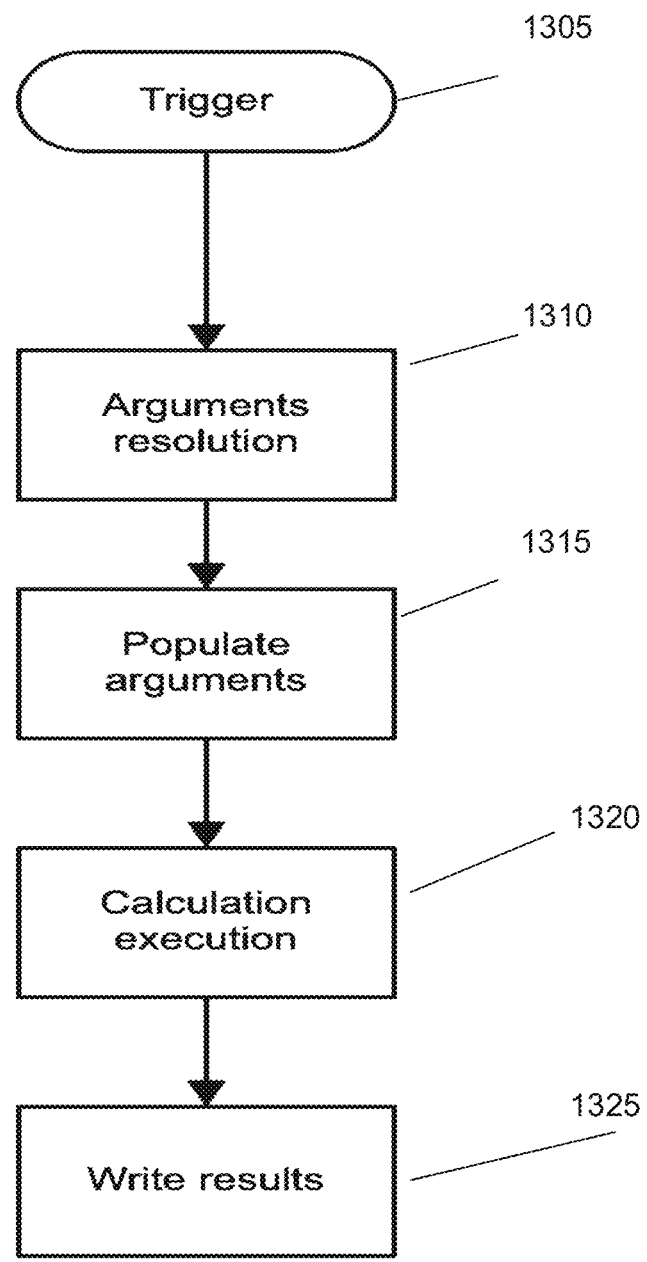
FIG. 13 illustrates aspects of generating derived value calculations in accordance with some implementations.

The implementations for derived value calculations have a variety of options. However, there are several logical steps which illustrate major aspects of the process. An embodiment of the execution strategy is illustrated in the flow chart of FIG. 13.

In block 1305, a process for derived value calculated is triggered. Triggering starts when a new value is received into Ingestion for a parameter defined as a calculation trigger. The configuration is queried for the appropriate calculation instance to run for the given trigger.

In block 1310, argument resolution is performed. Since most calculations are dynamically bound, we must use the calc/arg configuration combined with the anchor output parameter to fully qualify the names of all inputs.

In block 1315, arguments are populated. Metadata is retrieved, and actual time-series queries are executed to populate a dataset for each input argument, using time scope configuration and the anchor of the trigger time. Units are also converted to the expected units for the calculation.

In block 1320, calculation execution is performed to generate a populated mathematical expression and evaluate it.

In block 1325, the results are written. This may include converting the output units of the equation to the units of the output parameter. These records may be stored in the time-series store, using the same timestamp as the trigger.

Data Classification

1. Overview of the Data Classification Problem

In large enterprises, managing data throughout its lifecycle presents a significant challenge, particularly in regards to a conventional tiered data platform, such as FIG. 1. This is especially true in highly controlled industries such as government, finance, and aviation. Data is generated by some originating system. In the modern enterprise, this could be an online application collecting data through interactions with customers, employees entering business data (sales, purchases, etc.) into functionally specific systems (i.e., ERP, EAM, CRM, etc.), automatically generated metadata, or the data generated by machines during their operation. In all cases, individual pieces of data may be more sensitive than others. For example, unreported financial results, design specs of military hardware, or personal health information. The challenge for businesses is to protect this data from improper exposure while maintaining their ability to utilize it, and the less-critical data adjacent to it, to maximum effect in driving business value.

Organizations will typically stratify data, with raw data at its point of origin as the lowest tier, and systems employed to increase the value of data by consolidating, aggregating and enriching it at successively higher tiers. These systems and strategies are often referred to as Data Warehouses, Data Lakes, or Business Intelligence.

Often, the lowest level consists of the operating data stores for individual software or hardware systems. To the extent that these systems generate sensitive data, they tend to have small groups of users, granular access controls, and strict user authentication subsystems. However, as the data is aggregated at higher tiers, the potential audience of users grows and most significantly the granularity of access controls tends to diminish.

Existing scalable data platforms do not provide granular access controls (by data field, for example) and the application of their controls is applied to generic constructs like tables and databases, without the domain specific reasoning present in the source system. For this reason, it is comparatively easy to improperly secure sensitive data at the aggregate level after it has been merged with data from many other business processes.

This problem is exacerbated by the concept of co-mingled data, indicating a situation where highly sensitive data is generated and stored with other data of lower sensitivity. Protecting the critical data without unduly restricting access to the less sensitive data is a key struggle for many businesses today. In compliance driven industries, the response is often to emphasize safety first in protecting from non-compliant data exposure. As a result, opportunities to leverage data at all levels of sensitivity is diminished.

2. Classification Driven Access Control Mechanism

In some implementations, access to data via the Decision Intelligence System is available via two mechanisms: API's publishes for external access, and an internal preview functionality. In some implementations, Classification Driven Access Control is used for both of these mechanisms.

The data being accessed is defined by the configuration of a "question" in the Decision Intelligence System. These questions contain, among other configuration, a list of the properties contained in the question output. For the purposes of access control, this list of properties is used to generate a list of all the unique classifications attached to all the properties.

This master list of applied classifications for a question is, at the moment a request is made to return data, compared to the list of permitted classifications associated with the user making the request. Each classification associated with the question must also be associated with the user for the request to be allowed. If even one classification is missing from the user's profile, then the request for data is disallowed. Having additional tags associated with the user that are not associated with the question is immaterial.

In one embodiment, the Decision Intelligence System supports classification driven access control. The raw data may or may not have been aggregated by the time it is ingested by the Decision Intelligence System. However, in some implementations the Decision Intelligence System provided powerful abstraction and analytical capabilities to increase the value of data.

In some implementations, the process of connecting to underlying data sources, mapping them to semantic models, and allowing users to answer questions with the data in the form of API's, results in the challenges of protecting sensitive data even when it is co-mingled with other data. Data protection can be provided using user authentication, role-based access controls, certificate authentication for API access, and user-based authentication for API access. In addition, the Decision Intelligence System introduces a method of access control that allows complete granularity down to individual fields of data based on field-level classifiers.

This approach of Classification Driven Access Controls includes providing the ability for platform owners to specify a standard list of classifications which may be applied to data. (e.g., Export Controlled (EC), Confidential, etc.) These classifications can be unique to each user's industry and in their own terminology, though this often reflects standard (usually government driven) classifications.

Figure 14:
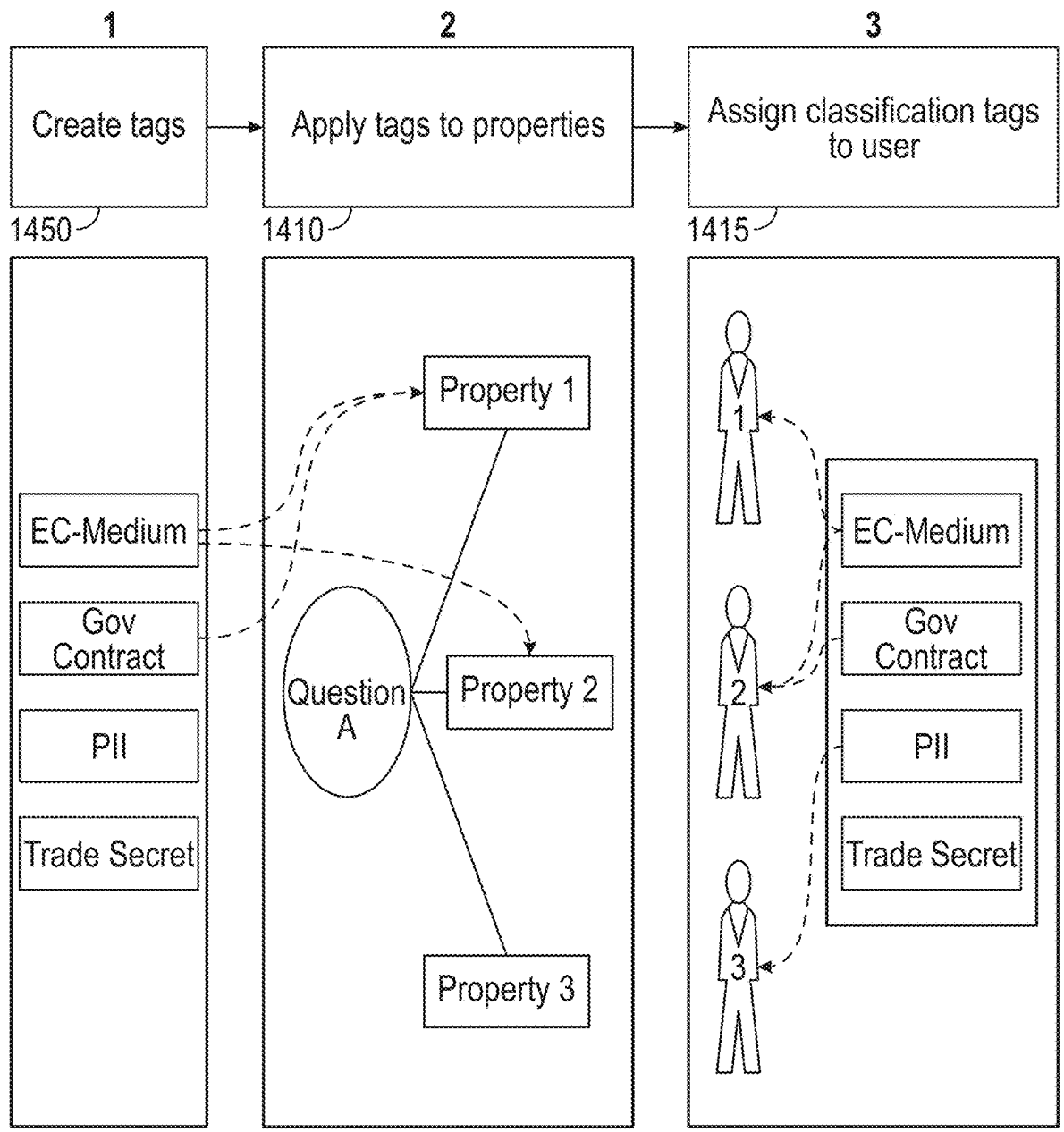
FIG. 14 is a flow chart illustrating use of tags for access control in accordance with some implementations.

FIG. 14 illustrates a potential collection of classification tags and the process for generating them to form an association of classification tags with system users. In block 1405, tags are created. Some examples of tags include tags such as trade secret, government contract, EC-medium, and Pll. In block 1430 tags are applied to properties. For example, a government contract tag may be applied to property 1 of question A. Not that more than one tag may be applied to an individual property. In block 1460, classification tags are assigned to user. For example, the classification tag for a government contract may apply to user 2, but not user 1.

This process of apply tags and assigning classification tags to users may be based on a standard list created for an organization. This provides the ability for the authors of models in the Decision Intelligence System to apply these tags, on a property by property basis when they design the models. This approach also supports a simple selection of one or more classifications taken from a standard list for an organization.

Figure 15:
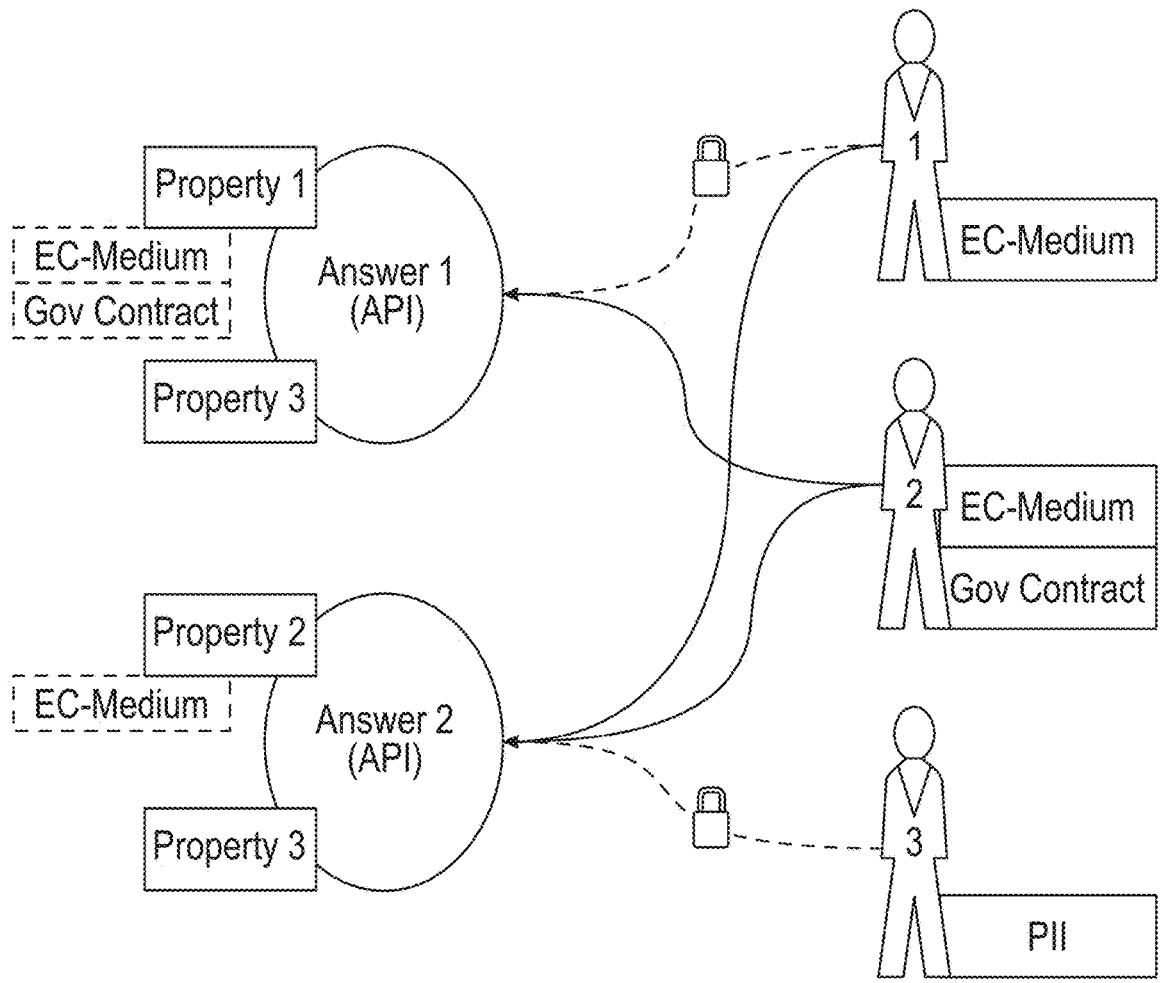
FIG. 15 illustrates an example of API access control using the tags of FIG. 14 in accordance with some implementations.

FIG. 15 illustrates a process for applying classification tags to model properties to restrict access. FIG. 15 illustrates the interactions between users and API's providing access to classified data, showing both permitted and blocked scenarios.

The solid lines indicate that access is granted while the dashed line with a lock indicates that a user is blocked access. For example, consider the Answer 1 API, which has property 1 with tags EC-medium and Gov Contract. Of the 3 users illustrated, only user 2 has matching tags for all of the tags associated with Property 1 of Answer 1.

Now consider Answer 2, which has property 2 with the tag EC-medium. Only user 1 and user 2 have a matching tag, and are thus permitted access. User 3 does not have a matching tag, and has their access restricted.

The example of FIGS. 14-15 illustrates the ability for platform administrators to apply these tags on a user by user basis when they configure users of the system. A simple selection of one or more classifications may be taken from the standard list for their organization.

User Experience Examples

1. One-Click API Deployment

Figure 16:
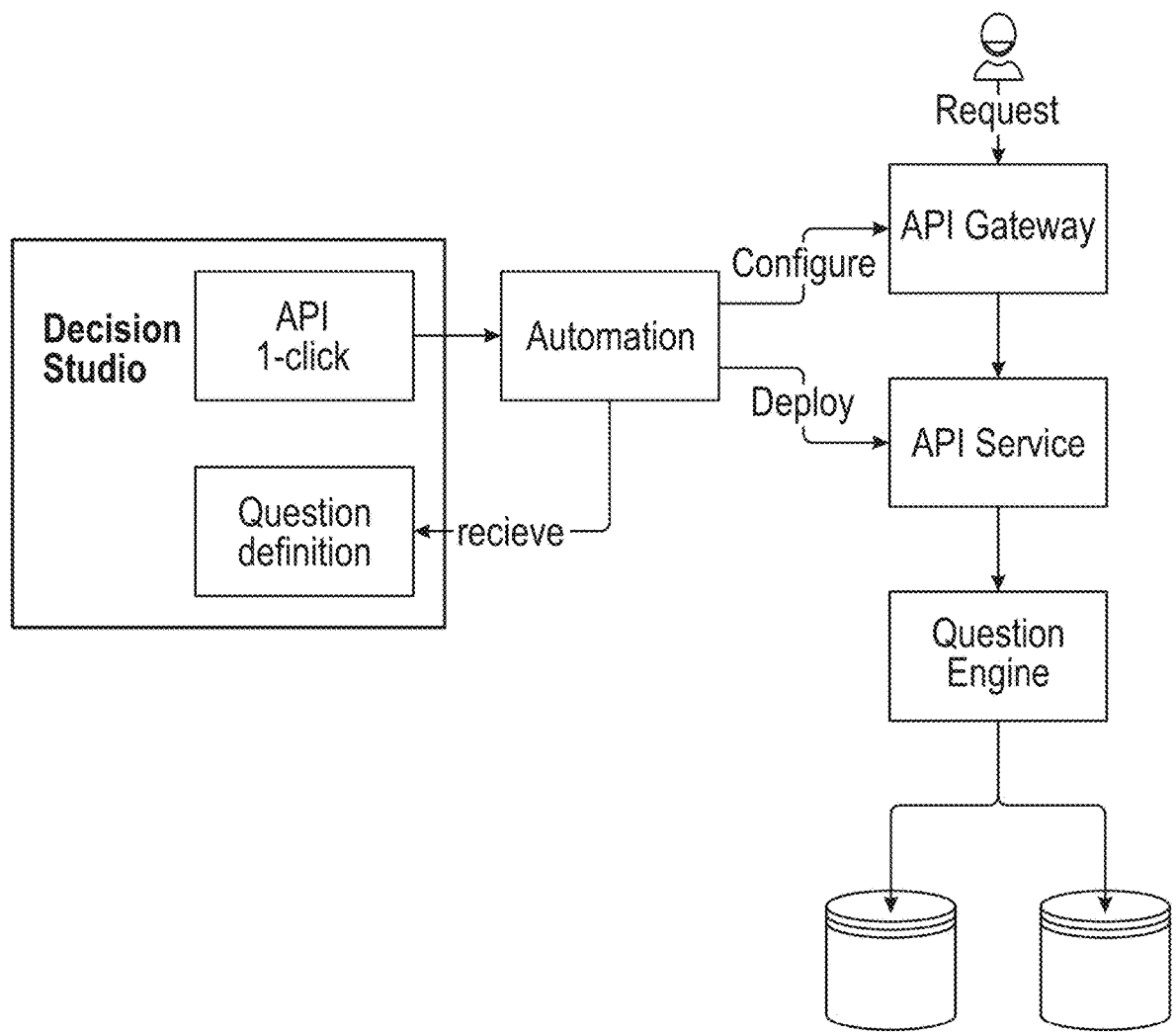
FIG. 16 illustrates an example a 1-click API process in accordance with some implementations.

FIG. 16 illustrates the deployment of API's based on the user initiating the publishing action in the Decision Intelligence Studio 250 interface.

In one embodiment, the Decision Intelligence System allows the deployment of API resources with a single click after query authoring. The saved query is applied against the indicated dataset in the form of auto-generated API code. This code is deployed using a transparent Continuous integration (CI) and continuous delivery (CD) CI/CD process to a container. This process allows extremely rapid development of API endpoints to support application development, etc.

Referring to FIG. 16, after a query is authored, it may be deployed after a single click. The automation process receives the 1-click command and retrieves the saved query definition. The automation process configures an API gateway and deploys an API service that accessed a question engine.

2. Radial Visualization of Knowledge Models

In some implementations, the Decision Intelligence System includes applications provide radial visualization of user-defined knowledge models.

Figure 17:
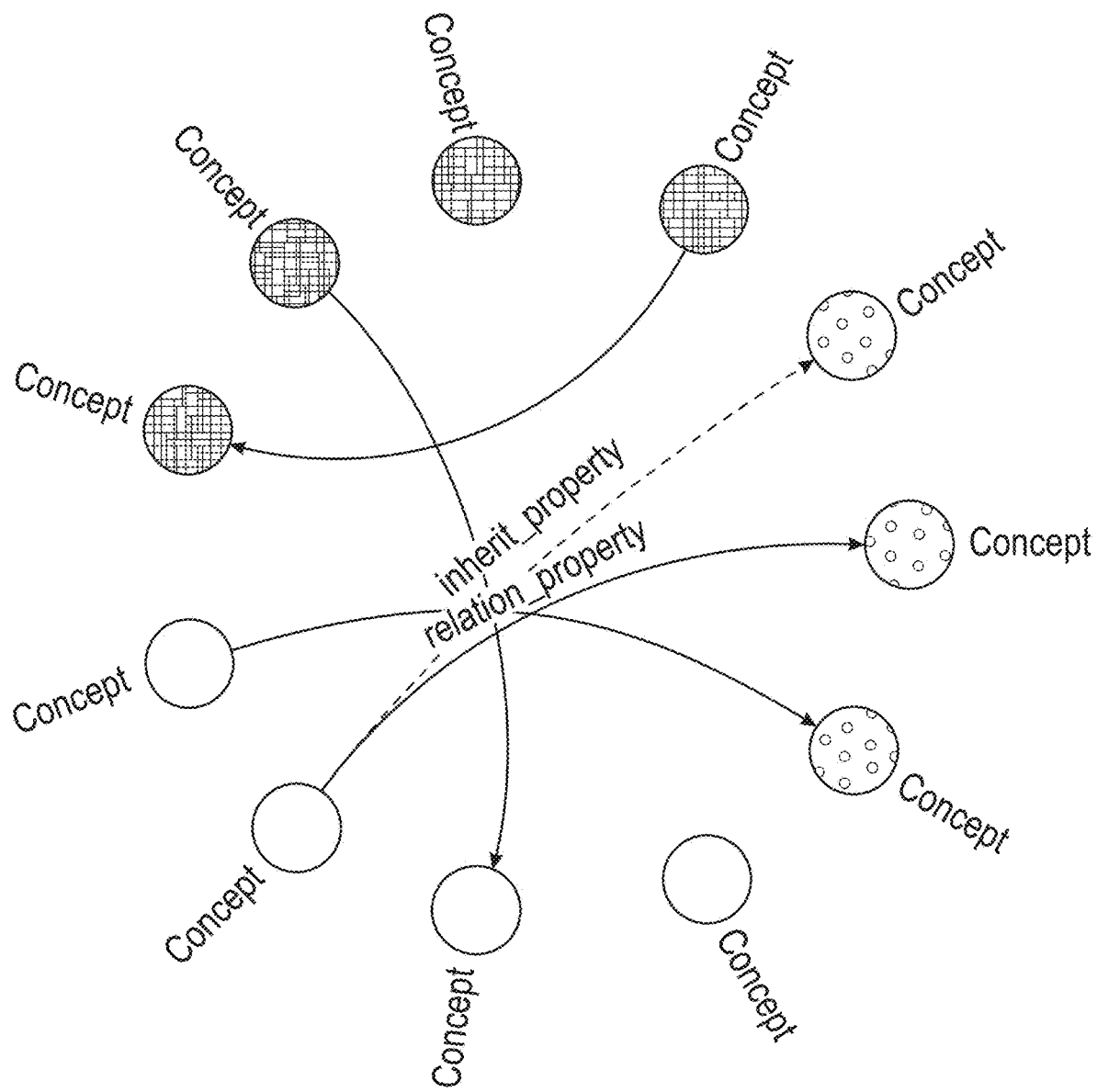
FIG. 17 illustrates an example of a radial visualization in accordance with some implementations.

FIG. 17 illustrates examples of radial visualization in accordance with an embodiment. In one embodiment, the Decision Intelligence System applies a radial visualization to user defined knowledge models. This approach has several advantages over traditional "blob" representations of knowledge models:

Consistent shape allowing users to engage with the model more quickly

Reproducibility between visuals—every time a user looks at a model the nodes are in the same places.

Circular dimension allows ordering of nodes (alphabetically, clockwise, from 3 o'clock, for example) not possible with blob representations.

Further, in one embodiment, color coding is utilized to indicate inheritance and importing of external models. Mouse-over selection is used to highlight individual nodes and their connected edges for clarity.

In the example of FIG. 17, a model may be illustrated by a set of connected concepts. The relationships between concept nodes of the model are illustrated. For example, solid arrows may illustrate a relation property and dashed arrow may illustrate an inherit property.

3. Zooming from Model-of-Models to Models

Figure 18:
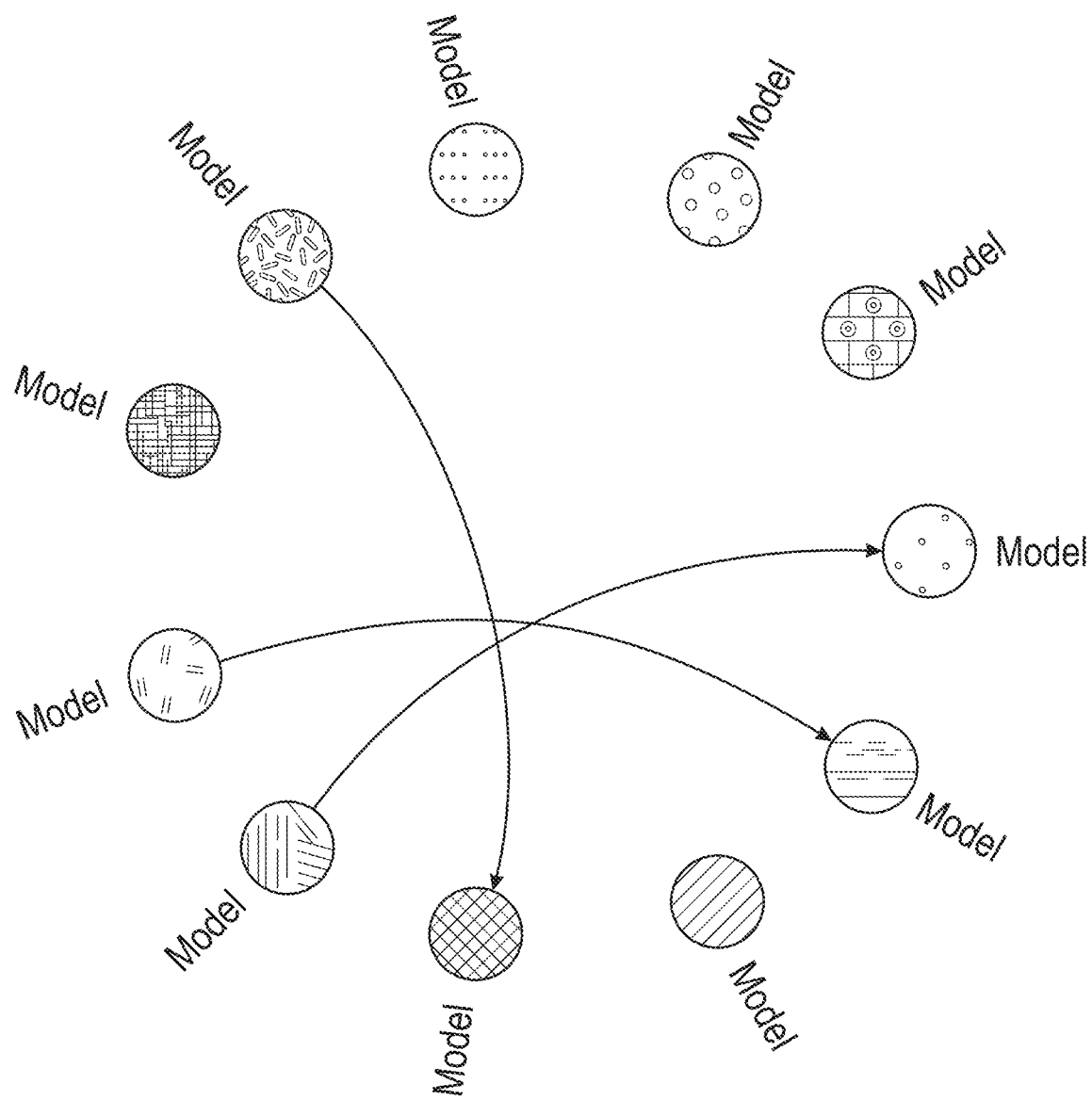
FIG. 18 illustrates an example of zooming out of a radial visualization in accordance with some implementations.
Figure 19:
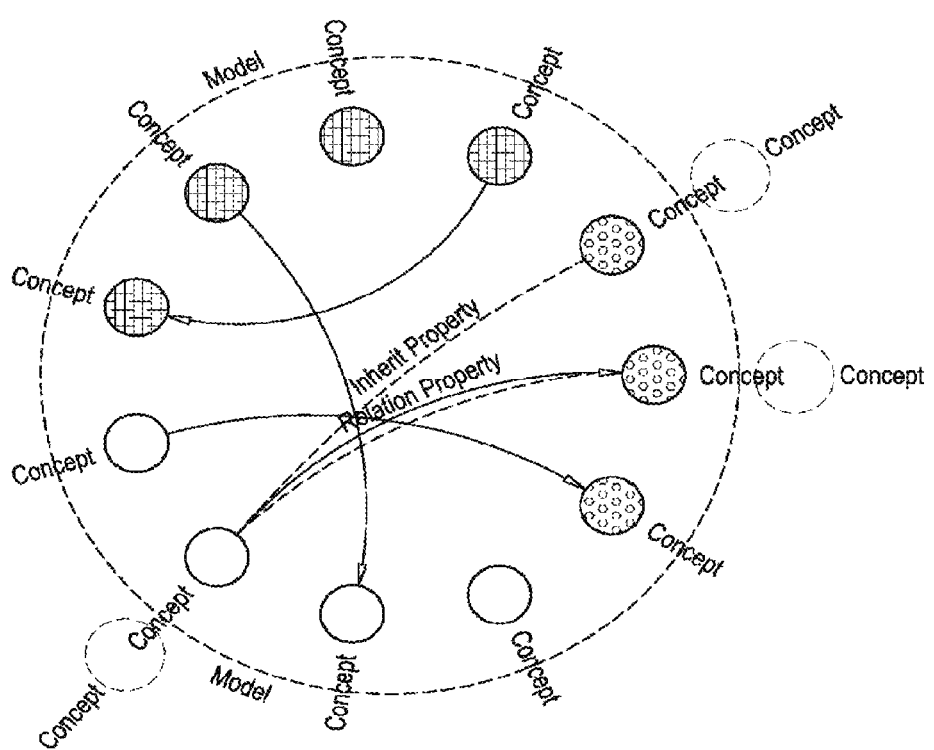
FIG. 19 illustrates an example of zooming in on a radial visualization in accordance with some implementations.

FIGS. 18-19 illustrate examples of zooming in and zooming out in accordance with an embodiment. In one embodiment, the Decision Intelligence System uses a consistent radial view to enhance the notion that models can be "zoomed in" or "zoomed out" to differing levels of specificity. At the lowest level, queries and domain models are shown as connected concepts. Zooming out, domain models are shown connected by import and inheritance relationships.

4. Visualization of Semantic Query as Ghost Ring Around Radial Model

Figure 20:
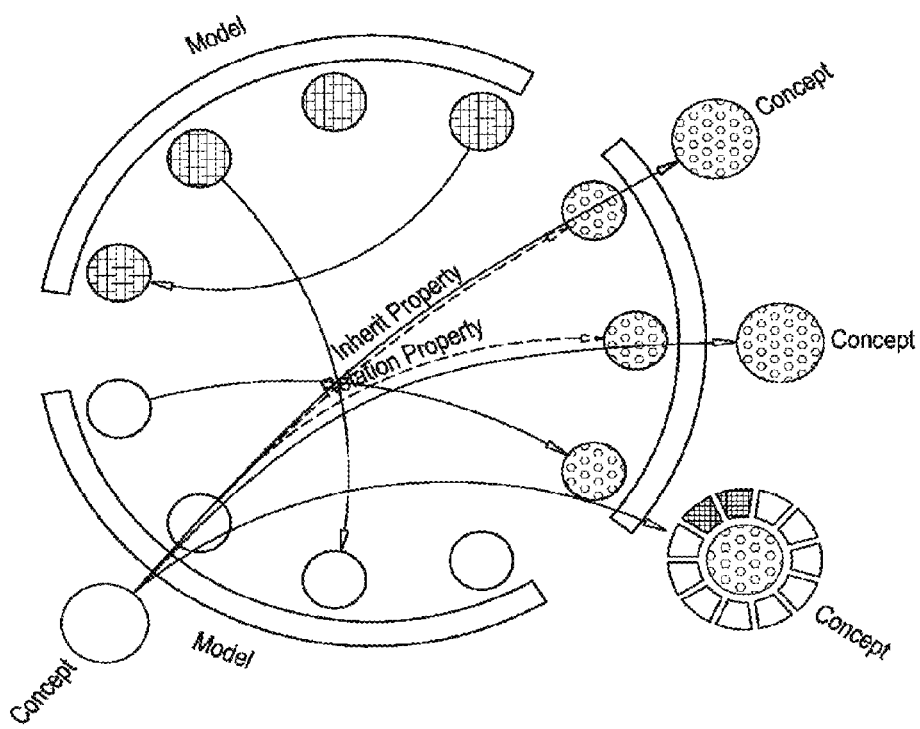
FIG. 20 illustrates an example of a visualization of a semantic query as a ghost ring around a radial model in accordance with some implementations.
Figure 21:
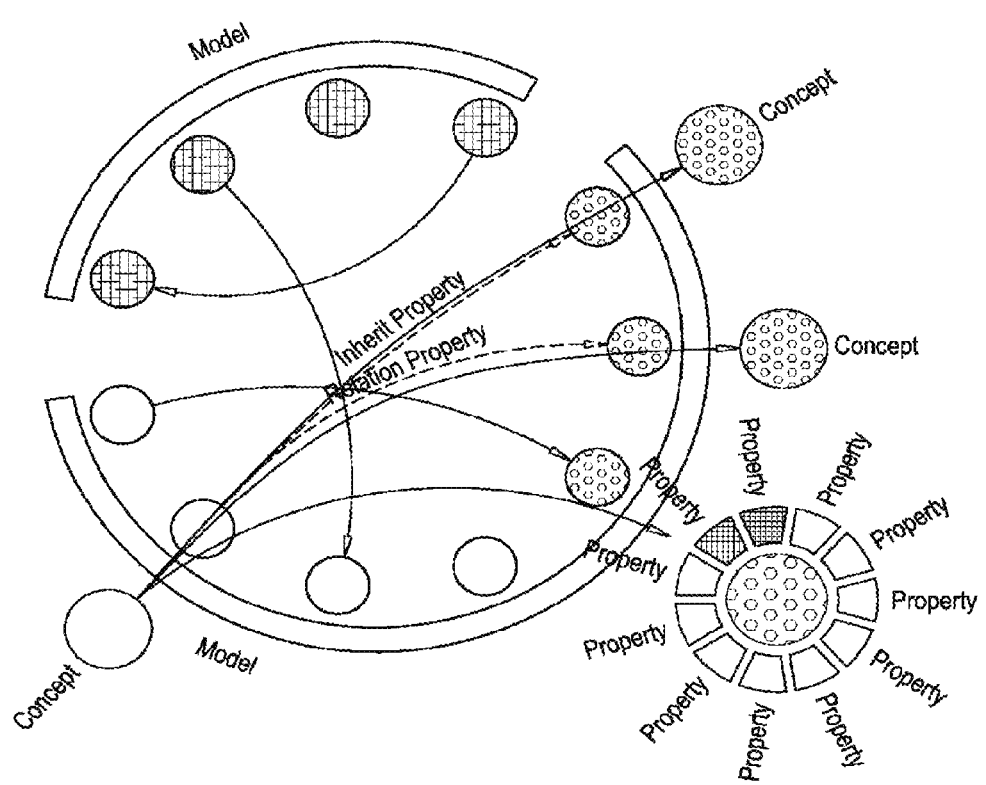
FIG. 21 illustrates an example of a query selected in accordance with some implementations.

FIGS. 20-21, illustrate an example of visualization of a semantic query as a ghost ring around a radial model in accordance with an embodiment. FIG. 20 illustrates a model selected and FIG. 21 illustrates a query selected.

Authoring queries based on knowledge models typically involves separate views of the model and the evolving query. Either can be represented in graph form, radially (as per an embodiment of the Decision Intelligence System) or in a hierarchical list of concepts and properties. In these approaches, the relationships between concepts (in the model) and concept instances (in the query) are often lost or difficult to see at a glance. To solve this challenge, in one embodiment the Decision Intelligence System extends the radial model navigation to superimpose a query around its source model as a "ghost" ring.

Selection of the query or model restores color to that ring while the other is greyed out. Radial layout of model concepts is aligned with associated query concept instances.

It will be understood that variations in the "ghosting" may be supported, such changed to texture instead of greying out features.

5. Model Metric Visualization as Halos on Graph Nodes

The traditional visualization of a knowledge model as a system of connected dots is enhanced by adding "rings" or "halos" to each node to convey additional information. These rings are only visible when a node is selected for focus. Examples of data conveyed includes:

Number of concepts in a model

Number of properties in a concept

Quantity of concept instances in a dataset

Number of properties mapped to source data

Properties selected for query participation

FIG. 20 illustrates an example of model metric visualization as halos on graph nodes.

6. Benefits

In some implementations, the Decision Intelligence System provides one or more of the following benefits:

Combines an interactive Decision Intelligence Studio 250 with dynamic Decision Intelligence Applications and Edge Bots for a domain-rich, continuous-learning Decision Intelligence system Easy, self-service interface for anyone to capture and use Business Knowledge Crowdsource knowledge from all organizational stakeholders Integrates AWL output without re-engineering data, to enable continuous learning system Automated visualization of business outcomes Rapidly stitch data across multiple data sources with code-less, visual tools Code-less, Powerful Semantic API engine (eliminates business transformations, data modeling, query writing)

Greatly reduced data wrangling time for Data Scientists

In some implementations, the Decision Intelligence system supports:

a strategy for building apps on top of mapped knowledge models (user driven, no Extract, Transform, and Load (ETL), simplification of steps, etc.)

a strategy for graphically representing transformations a strategy for integrating business functions via overlapping models, especially around assets (i.e., stitching data)

a strategy regarding which personas are involved auto-building a "360 degree view" based on model expansion a strategy for knowledge models Alternate Embodiments and Implementations Including Computing Systems, SaaS, and Cloud-Based Solutions In a commercial implementation, the Decision Intelligence System 200 may be supported by one or more computer devices or computer systems. That is, the software code to implement individual processes for the Decision Intelligence Studio 250, Decision Intelligence Applications 205, and Decision Intelligence Platform 305 may be stored on a non-transitory computer readable medium and executed by a processor. The Decision Intelligence System 200 may be implemented to support generating user interfaces on client devices, such as client computers of business people, client computers of data experts, client computer of enterprise consumers, etc. As previously discussed, interfaces to support accessing data source 290 are provided.

The computer system to implement the one or more portions of the Decision Intelligence System 20 may, for example, include processors, memory, internal buses, etc.

Databases may be provided to store data for individual users. Additionally, network interfaces and communication devices may be included to communicate with other networks, systems, sensors, etc.

A client device of an end-user may, for example include a computing device and input/output user interfaces.

In a SaaS implementation, for example, the code may be stored on a memory of a computing system. In such as SaaS implementation, individual end users may access features of the Decision Intelligence System via a user interface of their client computing device. In a cloud-based implementation, the Decision Intelligence System may be implemented as a cloud-based service.

However, it will also be understood that enterprise-based solutions are also possible.

It will thus be understood that individual applications of the Decision Intelligence System may be implemented on a computing device or server implementing modules corresponding to any of the previously described methods and user interfaces. For example, one or more aspects of the Decision Intelligence System may be implemented using a processor, a memory, a communication unit, an input device, an output device, a data store, and internal communications buses to form a computer system.

The computer system may use a variety of communication protocols and/or technologies including, for instance, communication buses, software communication mechanisms, computer networks, etc.

As an example, the processor of the computer system may execute software instructions by performing various input, logical, and/or mathematical operations. The processor may have various computing architectures to method data signals (e.g., CISC, RISC, etc.). The processor 3 may be physical and/or virtual, and may include a single core or plurality of processing units and/or cores. In some implementations, the processor may be coupled to the memory via a bus to access data and instructions therefrom and store data therein. The bus may couple the processor to the other components of the computing system including, for example, the memory, the communication unit, the input device, the output device, and the data store.

The memory may store and provide data access to the other components of the computing system. The memory may be included in a single computing device or a plurality of computing devices. In some implementations, the memory may store instructions and/or data that may be executed by the processor. For example, the memory may store instructions and data, including, for example, an operating system, hardware drivers, other software applications, databases, etc. which may implement the techniques described herein. The memory 30 may be coupled to the bus for communication with the processor and the other components of computing system.

The memory may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor. In some implementations, the memory may include one or more of volatile memory and non-volatile memory (e.g., RAM, ROM, hard disk, optical disk, etc.). It should be understood that the memory may be a single device or may include multiple types of devices and configurations.

The bus can include a communication bus for transferring data between components of a computing device or between computing devices, a network bus system including the network or portions thereof, a processor mesh, a combination thereof, etc. In some implementations, various components operating on the computing device (operating systems, device drivers, etc.) may cooperate and communicate via a communication mechanism included in or implemented in association with the bus. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

A communication unit may include one or more interface devices (I/F) for wired and wireless connectivity among the components of the system. For instance, the communication unit may include, but is not limited to, various types of known connectivity and interface options. The communication unit may be coupled to the other components of the computing system via the bus. The communication unit 304 can provide other connections to the network and to other entities of the system 100 using various standard communication protocols.

The input device may include any device for inputting information into the computing system. In some implementations, the input device may include one or more peripheral devices. For example, the input device may include a keyboard, a pointing device, microphone, an image/video capture device (e.g., camera), a touch-screen display integrated with the output device, etc. The output device may be any device capable of outputting information from the computing system. The output device 3 may include one or more of a display (LCD, OLED, etc.), a printer, a haptic device, audio reproduction device, touch-screen display, a remote computing device, etc. In some implementations, the output device is a display which may display electronic images and data output by a processor of the computing system for presentation to a user, such as the processor or another dedicated processor.

The data store may include information sources for storing and providing access to data. In some implementations, the data store may store data associated with a database management system (DBMS) operable on the computing system. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

The data stored by the data store may be organized and queried using various criteria including any type of data stored by them. The data store may include data tables, databases, or other organized collections of data.

The data store may be included in the computing system or in another computing system and/or storage system distinct from but coupled to or accessible by the computing system. The data stores can include one or more non-transitory computer-readable mediums for storing the data. In some implementations, the data stores may be incorporated with the memory or may be distinct therefrom.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

To ease description, some elements of the system and/or the methods are referred to using the labels first, second, third, etc. These labels are intended to help to distinguish the elements but do not necessarily imply any particular order or ranking unless indicated otherwise.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program object accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and Modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. The disclosed technologies can take the form of an entirely hardware implementation, an entirely software implementation or an implementation containing both software and hardware elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention.

What is claimed is:

1. A method of providing decision intelligence, the method comprising:
 capturing a business knowledge model from an expert user to have a semantic ontology, the business knowledge model being associated with a business question and including concepts and properties;
 mapping data for the business knowledge model, wherein the mapping comprises:
  receiving, via a user interface, identification of a first column in a first table, wherein the first column comprises property values;
  based on the receiving the identification of the first column in the first table: generating a prompt to indicate at least one second column to uniquely identify concept instances to which the properties belong;
  in response to the prompt, receiving, via the user interface, identification of the at least one second column in the first table;
  identifying a function to be applied to values of the at least one second column, wherein each respective adapted value is derived based on applying the indicated identified function to the respective value of the at least one second column and uniquely identifies a concept instance with a concept property matching the respective property value of the property values of the first column;
  identifying a plurality of concept instances in the business knowledge model, wherein each respective concept instance matches the respective value derived based on applying the identified function to the respective value of the at least one second column; and
  updating each respective concept instance of the first plurality of concept instances based on a respective property value in the first column of the first table; and
 generating classification tags for access control;
 applying one or more classification tags to each property of the properties of the plurality of concept instances;
 assigning one or more classification tags to each user of a plurality of users;
 generating an application programming interface (API) to deploy the business knowledge model and the associated business question, concepts, and properties; and
 implementing access control for the API in which an access control condition requires a user of the plurality of users to have assigned classification tags that match all of the one or more classification tags that are applied to the property of an answer provided using the API to the associated business question for the user to be granted access to the answer to the business question.

2. The method of claim 1, wherein the plurality of concept instances is a first plurality of concept instances and wherein the mapping of data further comprises:
 receiving, via the user interface, identification of a third column in a second table, wherein the third column comprises property values;
 receiving, via the user interface, identification of a fourth column in the second table, wherein the fourth column comprises unique property values, and wherein the data in the fourth column of the second table is of a different data type than data in the at least one second column of the first table;
 identifying a second plurality of concept instances in the business knowledge model, wherein each respective concept instance matches a respective unique property value in the fourth column of the second table; and
 updating each respective concept instance of the second plurality of concept instances based on a respective property value in the third column of the second table.

3. The method of claim 2, wherein the mapping of data further comprises adapting to differences in source data using at least one adaptation function.

4. The method of claim 2, wherein the mapping of data further comprises mapping a concept to two or more source data tables.

5. The method of claim 4, wherein a hierarchy is used to map a concept to the two or more source data tables.

6. The method of claim 2, wherein the mapping of data further comprises mapping data with disjoint identifiers.

7. The method of claim 1, further wherein the business question and the business knowledge model are bundled into a solution as an instantiation of the business knowledge model and the business question.

8. The method of claim 1, wherein the data mapping links the business knowledge model to underlying data.

9. The method of claim 1, wherein the business knowledge model is translated into the semantic ontology.

10. The method of claim 1, wherein the API is deployed in response to a single click of the user interface.

11. The method of claim 1, wherein the business knowledge model is generated independently of the data structure of at least one data source used to populate the business knowledge model with data.

12. The method of claim 1, wherein the mapping comprises:
   generating a time trigger based on the data;
   selecting a subset of time series data based on the generated time trigger; and
   mapping at least one value generated based on the selected subset of time series data to a concept instance of the business knowledge model.

13. The method of claim 12, wherein selecting the subset of the time series data based on the generated time trigger comprises selecting a predetermined number of entries in the time series data before or after the generated time trigger.

14. The method of claim 13, further comprising utilizing the time series calculation for asset relationship management.

* * * * *